United States Patent [19]

Fukumoto et al.

[11] Patent Number: 5,390,162
[45] Date of Patent: Feb. 14, 1995

[54] METHOD FOR REPRODUCING SIGNALS RECORDED ON OPTICAL RECORDING MEDIUM

[75] Inventors: Atsushi Fukumoto, Kanagawa; Toshiki Udagawa; Shunji Yoshimura, both of Tokyo; Masumi Ono, Kanagawa; Kouichi Yasuda, Tokyo, all of Japan

[73] Assignee: Sony Corporation, Tokyo, Japan

[21] Appl. No.: 941,058

[22] PCT Filed: Oct. 19, 1991

[86] PCT No.: PCT/JP91/01438

§ 371 Date: Sep. 30, 1992

§ 102(e) Date: Sep. 30, 1992

[87] PCT Pub. No.: WO92/14245

PCT Pub. Date: Aug. 20, 1992

[30] Foreign Application Priority Data

Feb. 5, 1991 [JP] Japan ................. 3-035545

[51] Int. Cl.6 ................. G11B 11/10; G11B 11/03
[52] U.S. Cl. ................. 369/116; 369/275.2
[58] Field of Search ............ 369/116, 106, 122, 275.2

[56] References Cited

U.S. PATENT DOCUMENTS

| | | | |
|---|---|---|---|
| 4,157,568 | 6/1979 | Ohki et al. | 358/128 |
| 4,516,234 | 5/1985 | Nakagawa et al. | 369/109 |
| 5,062,091 | 10/1991 | Maeda et al. | 369/13 |
| 5,093,822 | 3/1992 | Kugiya et al. | 369/121 |
| 5,168,482 | 12/1992 | Aratani et al. | 369/13 |
| 5,329,512 | 7/1994 | Fukimoto et al. | 369/121 |

FOREIGN PATENT DOCUMENTS

| | | |
|---|---|---|
| 4018275 | 12/1990 | European Pat. Off. . |
| 59605 | 3/1986 | Japan . |
| 187439 | 8/1988 | Japan . |
| 143041 | 6/1989 | Japan . |
| 143042 | 6/1989 | Japan . |

*Primary Examiner*—Paul M. Dzierzynski
*Assistant Examiner*—David V. Bruce
*Attorney, Agent, or Firm*—Hill, Steadman & Simpson

[57] ABSTRACT

A method for reproducing a magneto-optical recording medium the recording pits of which are erased or relieved with rise in temperature of the recording medium caused by radiation of a readout light beam or an optical recording medium the reflectance of which is changed with rise in temperature of the recording medium caused by radiation of the readout light beam, in which changes in the size of an effective reproducing region due to the temperature of the recording medium may be inhibited. To this end, when the magneto-optical disc 11, for example, is rotated at a constant angular velocity, a detecting unit 17 is provided for detecting the radial position of the magneto-optical disc 11 and the laser power as well as the external magnetic field is controlled depending on an output of the detecting unit 17 for controlling the size of an effective reproducing region to be constant without regard to the linear velocity at each reproducing position.

14 Claims, 15 Drawing Sheets

METHOD FOR REPRODUCING SIGNALS RECORDED ON OPTICAL RECORDING MEDIUM

TECHNICAL FIELD

This invention relates to a method for reproducing signals from an optical recording medium in which signals are read while a light beam is radiated on the recording medium. More particularly, it relates to a method for reproducing signals from the recording medium capable of reproducing the information recorded with high recording density.

BACKGROUND ART

An optical recording medium may be roughly classified into a read-only medium, such as a so-called compact disc, and a medium on which signals can be recorded, such as a magneto-optical disc. With any of these optical recording media, it is desired to improve the recording density to a higher level. It is because a data volume several to more than ten times that of digital audio signals is required when recording digital video signals and because demands are more for reducing the size of the recording medium, such as a disc and hence the size of a product, such as a player, even when recording digital audio signals. Besides, a larger recording capacity is desired for data disc in general.

Meanwhile, the recording density of recording the information on the recording medium is governed by the S/N ratio of the playback signals. In typical conventional optical recording and reproduction, the total area of a beam spot SP, which is a radiation region of the readout beam, such as the laser beam for the optical recording medium, as shown in FIG. 1A, is a playback signal region. Thus, the reproducible recording density is governed by the diameter $D_{SP}$ of the beam spot of the readout beam.

If, for example, the diameter $D_{SP}$ of the beam spot SP of the readout laser beam is less than a pitch g of a recording pit RP, two recording pits cannot be present in the spot SP, and the playback output waveform is as shown in FIG. 1B, so that the playback signals can be read. However, if the recording pits SP are formed at a higher density, and the diameter $D_{SP}$ of the beam spot SP becomes larger than the pitch g of the recording pit RP, as shown in FIG. 1, two or more pits may be present simultaneously in the spot SP, so that the playback output waveform becomes substantially constant as shown in FIG. 1D. In this case, these two recording pits cannot be reproduced separately, so that reproduction becomes infeasible.

The spot diameter $D_{SP}$ depends on the wavelength $\lambda$ of the laser light and on the numerical aperture NA. It is this spot diameter $D_{SP}$ that governs the pit density along the scanning direction of the read-out beam or the recording track direction, or the so-called line density, and the track density conforming to the track interval between neighboring tracks in a direction at right angles to the scanning direction of the readout light beam, or the so-called track pitch. The opto-physical limits of the line density and the track density are set by the wavelength $\lambda$ of the readout beam source and the numerical aperture NA of an objective lens and the readout limit of $2NA/\lambda$ is generally accepted as long as the spatial frequency at the time of signal reproduction is concerned. For this reason, for achieving high density of the optical recording medium, it is necessary to diminish the wavelength $\lambda$ of the light source of the reproducing optical system, such as a semiconductor laser as well as to enlarge the numerical aperture NA of the objective lens.

The present Applicant has already proposed an optical recording medium in which the recordable line recording density as well as the track density may be increased without changing the spot diameter of the readout beam spot, and a method for reproducing the optical recording medium. The optical recording medium capable of reproducing the high density information in this manner may be enumerated by a magneto-optical recording medium capable of recording information signals and a variable reflectance type optical recording medium at, least capable of reproducing information signals.

The above-mentioned magneto-optical recording medium includes a magnetic layer, such as a rare earth-transition metal alloy thin film, deposited on a major surface of a transparent substrate or light-transmitting substrate of e.g. polycarbonate, together with a dielectric layer and a surface protecting layer. The magnetic layer has an easy axis of magnetization perpendicular to the film surface and exhibits superior magneto-optical effect. The laser light is irradiated from the side of the transparent substrate for recording/reproducing information signals. Signals are recorded on the magneto-optical recording medium by so-called thermomagnetic recording in which the magnetic layer is locally heated by e.g. laser beam radiation to close to the Curie temperature to reduce the coercivity to zero in this region and a recording magnetic field is applied to this region from outside for magnetization in the direct, ion of the recording magnetic field. The recorded signals may be reproduced by taking advantage of the magneto-optical effect, such as the so-called magnetic Kerr effect or Faraday effect, in which the plane of polarization of the linearly polarized light, such as laser beam, is rotated in the direction of the magnetization of the magnetic layer.

The variable reflectance type optical recording medium is produced by depositing a material changed in reflectance with temperature on a transparent substrate on which phase pits are formed. During signal reproduction, the readout beam is radiated on the recording medium and the reflectance is partially changed within the scanning spot of the readout light to read out the phase pits.

In connection with the above-mentioned magneto-optical recording medium, high density reproduction or so-called high resolution reproduction is hereinafter explained.

The present Applicant has previously proposed in e.g. Japanese Patent Laid-Open Publication No. 1-143041 (1989) and Japanese Patent Laid-Open Publication No. 1-143042 (1989) a method for reproducing information signals for a magneto-optical recording medium wherein information bits (magnetic domain) are enlarged, diminished or reduced to zero for improving the playback resolution. The essential point of the technology consists in that the recording magnetic recording layer is an exchange-coupled multilayer film composed of a reproducing layer, an intermediate layer and a recording layer, and in that the magnetic domain heated by the playback laser beam during reproduction is enlarged, diminished or erased at a zone of higher temperatures for diminishing the inter-bit interference during reproduction to render it possible to reproduce signals of a period lower than the light diffraction threshold. There is also proposed in the application documents of Japanese Patent Application No. 1-229395 (1989) a technology in which the recording layer of the magneto-optical recording medium is formed by a multilayer film including a magnetically coupled reproducing layer and a recording holding layer, the direction of magnetization is aligned in advance to an erased state, the reproducing layer is heated to a temperature higher than a predetermined temperature by irradiation of the laser beam and in which magnetic signals written on the recording holding layer only in this heated state are read out while being transcribed on the reproducing layer to eliminate signal crosstalk to improve the line recording density and the track density.

The above-described high density reproducing technology may be roughly classified into an erasable type and a relief type, shown schematically in FIGS. 2A, 2B, 2C, 3A, 3B and 3C, respectively.

Referring first to FIGS. 2A, 2B, 2C, the erasable type high density reproduction technique is explained. With the erasable type, the recording medium, on which information recording pits RP are exhibited at room temperature, is heated by irradiation of a laser beam LB to produce an erased region ER within the beam spot SP of the radiated laser beam LB, as shown in FIG. 2B, and the recording pit RP within a remaining region RD within the beam spot SP is read, by way of achieving reproduction with improved line density. In sum, this technique consists in that, when reading the recorded pit RP within the beam spot SP, the erased region ER is used as a mask to narrow the width d of the read-out region (playback region) RD to provide for reproduction with an increased density along the scanning direction of the laser beam (track direction), that is the so-called line recording density.

The recording medium for erasable type high density reproduction has an exchange-coupled magnetic multi layer film structure composed of an amorphous rare earth for photomagnetic recording (Gd, Tb)-iron group (Fe, Co) ferrimagnetic film. In an example shown in FIG. 2A, the recording medium has a structure in which a reproducing layer as a first magnetic film 61, an interrupting layer (intermediate layer) as a second magnetic layer 62 and a recording holding layer as a third magnetic layer 63, deposited in this order on a major surface (the lower surface in the drawing) of a transparent substrate 60 formed of e.g. polycarbonate. The first magnetic layer (reproducing layer) 61 is e.g. a GdFeCo layer with a Curie temperature $T_{C1} > 400°$ C., while the second magnetic layer (interrupting layer or an intermediate layer) 62 is e.g. a TbFeCoAl film having a Curie temperature $T_{c2}$ of 120° C. and the third magnetic layer (recording holding layer) is e.g. a TbFeCo layer with a Curie temperature $T_{c3}$ of 300° C. Meanwhile, arrow marks in the magnetic films 61 to 63 shown in FIG. 2C represent the direction of magnetization of the magnetic domains. $H_{read}$ represents the direction of the reproducing magnetic domain.

The reproducing operation is briefly explained. At an ambient temperature below a predetermined temperature $T_{OP}$, the layers 63, 62 and 61 of the recording medium are magnetically coupled in the state of static magnetic coupling or exchange coupling, while the recording magnetic domain of the recording holding layer 63 is transcribed to the reproducing layer 61 by means of the interrupting layer 62. If the laser beam LB is radiated on the recording medium for raising the medium temperature, changes in the medium temperature are produced with a time delay with the scanning of the laser beam, so that a region at a temperature higher than the predetermined temperature $T_{OP}$, that is the erased region ER, is shifted slightly towards the rear side of the laser spot SP in the laser scanning direction. The quantity of this shifting is related to the scanning speed of the laser light, that is to the velocity of movement of the recording medium (or linear velocity in the case of the magneto-optical disc). At the temperature higher than the predetermined temperature $T_{OP}$, the magnetic coupling between the recording holding layer 63 and the reproducing layer 61 disappears and the magnetic domains of the reproducing layer 61 are aligned in the direction of the reproducing magnetic field $H_{read}$, with the recording pits being erased on the medium surface. A region RD of the scanning spot SP, excluding a superposed region with the region ER where the temperature is higher than the predetermined temperature $T_{OP}$, substantially represents a reproducing region. That is, the laser spot SP of the laser beam is partially masked by the region ER where the temperature becomes higher than the predetermined temperature $T_{OP}$, so that the small unmasked region becomes the reproducing domain RD to achieve high density reproduction.

Since pits may be reproduced by detecting e.g. the Kerr rotation angle of the beam reflected from a small reproducing region (readout region RD) in which the scanning spot SP of the laser beam is not masked by the masking region (erased region ER), the beam spot SP is equivalently increased in diameter for increasing the line recording density and the track density.

In the relief type high density reproducing technique, shown in FIG. 3B, the recording medium in a state in which information recording pits RP are erased at ambient temperature (initialized state) is irradiated with a laser beam and thereby heated to form a signal detecting region DT, as a recording relieved region, within the beam spot SP of the laser beam, and only the recording pit RP within this signal detecting region DT is read for improving the playback line density.

The recording medium for such high density relief reproduction has a magnetic multilayer structure according to magnetostatic coupling or magnetic exchange coupling. In an example shown in FIG. 3A, a reproducing layer 71 as a first magnetic layer, a reproduction assistant layer 72 as a second magnetic layer, an intermediate layer 73 as a third magnetic layer 73 and a recording holding layer 74 as a fourth magnetic layer are stacked sequentially on a major surface (the lower surface in FIG. 3) of a transparent substrate 70 formed of e.g. polycarbonate. The first magnetic layer ( reproducing layer) 71 is formed e.g. of GdFeCo and has a Curie, temperature $T_{c1}22$ 300° C., the second magnetic layer (reproduction assistant layer) 72 is formed e.g. of TbFeCoAl and has a Curie temperature $T_{c2}120°$ C., the third magnetic layer (intermediate layer) 73 is formed e.g. of GdFeCo and has a Curie temperature $T_{c3}250°$ C. and the fourth magnetic layer (recording holding layer) 74 is formed e.g. of TbFeCo and has a Curie temperature $T_{c4}250°$ C. The magnitude of an initializing magnetic field $H_{in}$ is selected to be larger than a magnetic field $H_{cp}$ inverting the magnetization of the reproducing layer ($H_{in} > H_{cp}$) and sufficiently smaller than the magnetizing field $H_{cr}$ inverting the magnetization of the recording holding layer ($H_{in} << H_{cp}$). The arrows in the magnetic layers 71, 72 and 73 in FIG. 3C indicate the direction of magnetization in each domain, $H_{in}$ indicates the direction of the initializing magnetic field and $H_{read}$ the direction of the reproducing magnetic field.

The recording holding layer 74 is a layer holding recording pits without being affected by the initializing magnetic field $H_{in}$, the reproducing magnetic field $H_{read}$ or the reproducing temperature, and exhibits sufficient coercivity at room temperature and at the playback temperature.

The intermediate layer 73 exhibits perpendicular anisotropy less than that of the reproduction assistant layer 72 or the recording holding layer 74. Therefore, a magnetic wall may exist stably at the intermediate layer 73 when the magnetic wall is built between the reproducing layer 71 and the recording layer 74. For this reason, the reproducing layer 71 and the reproduction assistant layer 72 maintain the erased state (initialized state) in stability.

The reproduction assistant layer 72 plays the role of increasing coercivity of the reproducing layer 71 at room temperature, so that magnetization of the reproducing layer 71 and the reproduction assistant layer 72 may exist stably despite the presence of the magnetic wall. On the other hand, coercivity is decreased acutely during reproduction in the vicinity of the reproduction temperature $T_S$ so that the magnetic wall confined in the intermediate wall 73 is expanded to the reproduction assistant layer 13 to invert the reproducing layer 71 ultimately to extinguish the magnetic wall. By this process, pits are caused to appear in the reproducing layer 71.

The reproducing layer 71 has a low inverting magnetic field $H_{cp}$ so that the domains of overall surface of the layer 71 may be aligned by the initializing field $H_{in}$. The aligned domains are supported by the reproduction assistant layer 72 and may thereby be maintained stably even if there exist a magnetic field between the layer and the reproduction assistant layer 74. Recording pits are produced by the disappearance of the magnetic wall between the layer and the recording holding layer 74 during reproduction, as described above.

If the operation during reproduction is explained briefly, the domains of the reproducing layer 71 and the reproduction assistant layer 72 are aligned before reproduction in one direction (in an upward direction in FIG. 3C) by the initializing magnetic field $H_{in}$. At this time, a magnetic wall (indicated in FIG. 3C by a transversely directed arrow) is present stably so that the reproducing layer 71 and the reproduction assistant layer 72 are stably maintained in the initialized state.

A reproducing magnetic field $H_{read}$ is applied in an inverse direction while a laser beam LB is radiated. The reproducing magnetic field $H_{read}$ needs to be in excess of the magnetic field which inverts the domains of the reproducing layer 71 and the reproduction assistant layer 72 at a reproduction temperature $T_{RP}$ following temperature increase by laser irradiation to cause extinction of the magnetic field of the intermediate layer 73. The reproducing magnetic field also needs to be of a such a magnitude as not to invert the direction of magnetization of the reproducing layer 71 and the reproduction assistant layer 72.

With scanning by the laser light, temperature changes in the medium are produced with a delay, so that the region whose temperature exceeds a predetermined reproducing temperature $T_{RP}$ (recording relieved region) is shifted slightly from the beam spot SP towards the rear side along the scanning direction. The quantity of this shifting is related to the scanning speed of the laser beam, that is to the velocity of movement of the recording medium (or linear velocity in the case of the magneto-optical disc). With the temperature above the predetermined reproducing temperature $T_{RP}$, coercivity of the reproduction assistant layer 72 is lowered, so that, when the reproducing magnetic field $H_{read}$ is applied, the magnetic wall is caused to disappear so that the information of the recording holding layer 74 is transcribed on the reproducing layer 71. Thus, a region within the beam spot SP which does not reach the reproducing temperature $T_{RP}$ is masked and the remaining region within the beam spot SP becomes the signal detecting region (reproducing region) DT which is the recording relieved region. High density reproduction may be achieved by detecting e.g. the Kerr rotation angle of a plane of polarization of the reflected beam from the signal detecting region DT.

That is, the region within the beam spot SP of the laser beam LB which does yet not reach the reproduction temperature $T_{RP}$ is a mask region in which recording pits are not displayed, while the remaining signal detecting region (reproducing region) DT is smaller in area than the spot diameter, so that the line recording density and the track density may be increased in the same manner as described above.

There is also devised a high density reproducing technique consisting in a combination of the erasure type and the relief type. With this technique, the laser beam is radiated to the recording medium in an initialized state thereof in which recording pits are extinct at room temperature for heating the recording medium for forming a recording relieved region at a site slightly deviated towards the rear side of the beam spot of the radiating laser beam, while simultaneously forming an erased region of a higher temperature within the recording relieved region.

In the specification and the drawings of our co-pending JP Patent Application No. H 2-418110, having the same assignee as the present application (1991), there is proposed a signal reproducing method for a magneto-optical recording medium wherein a magneto-optical recording medium having at least a reproducing layer, an intermediate layer and a recording holding layer is employed, a laser beam is radiated and a reproducing magnetic field is applied to the reproducing layer, a temperature distribution generated by the laser radiation is utilized to produce a region where an initialized state is maintained, a region to which the information of the recording holding layer is transcribed and a region the domains of which are aligned in the direction of the reproducing magnetic field, in a field of view of the lens, to produce a state equivalent to optically masking the field of view of the lens to increase the line recording density and the track density as well as to assure satisfactory frequency characteristics at the time of reproduction, there being no risk that, even if the reproducing power is fluctuated, the region of transcription of the information of the recording holding layer be diminished or enlarged.

According to the above-described high density reproducing technique employing such magneto-optical recording medium, only the read region RD, which is in effect the signal reproducing region, or the recording pit RP within the signal detecting region DT, is read within the beam spot SP. Since the size of the read region RD or the signal detection region DT is smaller than the size of the beam spot SP, the distance between adjacent pits in the directions along and at right angles to the laser light scanning direction may be reduced to raise the line density and the track density to increase the recording capacity of the recording medium.

Meanwhile, with the above-described method for reproducing the high-density information, even although the external reproducing magnetic field is constant and the laser beam power is constant, the size of the region RD of FIG. 2B or that of the region DT of FIG. 3B, as the reproducing region, is fluctuated with the scanning speed of e.g. the laser beam, that is the velocity of movement of the recording medium (or the linear velocity of e.g. a magneto-optical disc).

For example, with the erasure type reproducing method, explained in connection with FIG. 2B. if the velocity of movement (linear velocity) of the recording medium, such as the magneto-optical disc, is low, the time necessary for a scanning spot SP to pass through a unit distance of movement becomes longer, so that the state of temperature distribution due to laser beam radiation is such that an erased region at a temperature higher than the Curie temperature $T_c$, or a mask region, becomes wider, as shown at a curve a in FIG. 4B and a mask region $ER_{LS}$ for low linear velocity shown in FIG. 4A, so that an effective readout region (reproducing region) RD is diminished.

On the contrary, if the velocity of movement (linear velocity) of the recording medium, such as the magneto-optical disc, is high, the time necessary for the scanning spot SP to pass through a unit distance of movement becomes shorter, so that the state of temperature distribution due to laser beam radiation is such that an erased region at a temperature higher than the Curie temperature $T_c$, or a mask region, becomes narrower, as shown at a curve b in FIG. 4B and a mask region $ER_{HT}$ for high linear velocity shown in FIG. 4A, so that an effective readout region (reproducing region) RD is enlarged.

With the relief type, as will become apparent from its operating principle, if the temperature of the magneto-optical recording medium is high, the reproducing region is increased, whereas, if the temperature of the magneto-optical recording medium is low, the reproducing region is diminished.

As described above, if, with the erasure type reproducing method or with the relief type reproducing method, the velocity of movement of the recording medium is fluctuated, there is a risk that stable reproduction with a high S/N ratio cannot be achieved. If, when the magneto-optical disc is rotated at e.g. a constant angular velocity (CAV) to effect reproduction, the scanning spot position of the reproducing beam, that is the reproducing position, differs along the disc radius, the readout region RD or the signal detecting region DT, as an effective reproducing region, differs with the reproducing position, because of the difference in the linear velocity, so that stable reproduction with good S/N ratio can not necessarily be assured.

The same may be said when reproducing a variable reflectance optical recording medium by way of high density reproduction or ultra high resolution reproduction. That is, since the portion within the readout light beam which is changed in reflectance is changed in size with changes in the velocity of movement of the recording medium (linear velocity), the high reflectance portion, which is in effect the reproducing region, is fluctuated in size with the linear velocity of the recording medium, so that stable reproduction can occasionally not be achieved.

SUMMARY OF THE INVENTION

In view of the above-described status of the art, it is an object of the present invention to provide a method for reproducing an optical recording medium in which, even although the velocity of movement of the magneto-optical recording medium or the variable reflectance type optical recording medium is changed, the size of the effective reproducing region may be maintained constant to assure stable reading of information signals.

According to the present invention, there is provided a method for reproducing information on an optical recording medium comprising a recording layer and a reproducing layer, the recording and reproducing layers being magnetically coupled to each other in steady state, the method comprising extinguishing magnetic coupling between the recording layer and the reproducing layer in a region the temperature of which is raised to a temperature higher than a predetermined temperature by irradiation with a readout laser beam during reproduction, and reading the recording information held by the recording layer in an area of an irradiated region other than the magnetic coupling extinguished region, characterized by detecting the reproducing position on the optical recording medium when rotating the optical recording medium at a constant rotational velocity for reproducing the recording medium, and controlling the size of the second region in accordance with the linear velocity at the reproducing position.

According to the present invention, there is also provided a method for reproducing information on an optical recording medium having a recording layer and a reproducing layer, the method comprising aligning the domains of the reproducing layer, transcribing the recording information to the reproducing layer and relieving the transcribed information, the recording information being held before transcription by a region on the recording layer the temperature of which is increased by irradiation with a readout beam during reproduction, and reading the recording information from the relived region of the reproducing layer, the method further comprising detecting a reproducing position on the optical recording medium when rotating the optical recording medium at a constant rotational velocity for reproduction, and controlling the size of the relieved region in accordance with the linear velocity at the reproducing position.

According to the present invention, there is additionally provided a method for reproducing information on an optical recording medium comprising radiating a readout beam to an optical disc on which phase pits are formed in accordance with signals and which is changed in reflectance with temperatures, and reading the phase pits while partially changing the reflectance within a scanning spot of the readout beam, the method further comprising detecting a reproducing position on the optical recording medium when rotating the optical recording medium at a constant rotational velocity for reproduction, and controlling the size of a portion within the scanning spot of the readout beam in which the reflectance is changed.

With the above-described reproducing method for the optical recording medium, an output of a laser light source radiating the readout beam on the optical recording medium may be controlled on the basis of an output detecting the reproducing position of the optical recording medium. The output of the laser light source may also be controlled on the basis of a comparison output between the output detecting the reproducing position of the magneto-optical recording medium and an output reference value of the laser light source which is a value stored in memory means and associated with each line velocity of the optical recording medium. The size of the magnetic coupling extinguished region, the relieved region or the region the reflectance of which is changed may also be controlled depending on the level of an output reproducing the optical recording medium.

Thus, according to the signal reproducing method for an optical recording medium according to the present invention, since the size of the effective reproducing region is not changed even if the linear velocity of the optical recording medium is changed of the reproducing position on the optical recording medium and hence the linear velocity at the reproducing position are changed, stable reproduction may be achieved with a high S/N ratio.

BEST MODE OF CARRYING OUT THE INVENTION

Figure 1A:
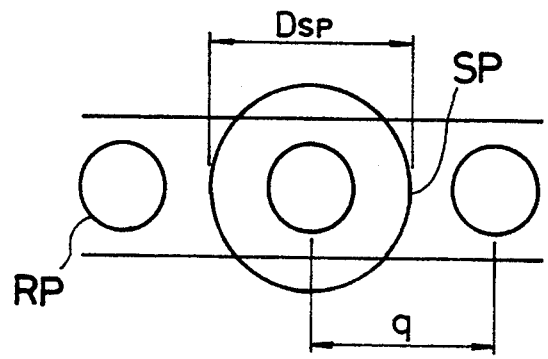
FIGS. 1A, 1B, 1C and 1D are diagrams illustrating the relation between the spot diameter of a laser beam and the recording density of reproducible recording pits.
Figure 1B:
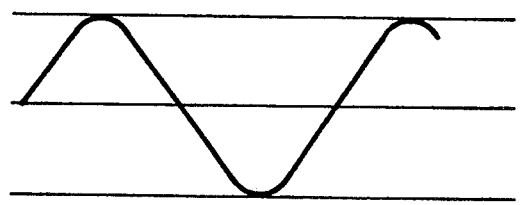
Figure 1C:
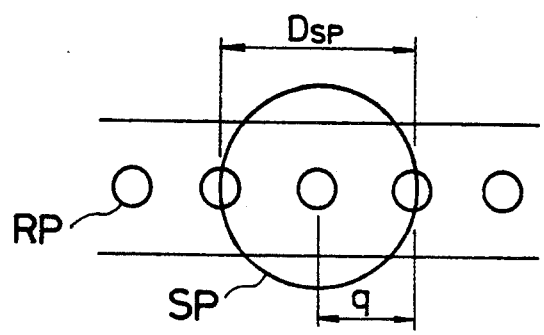
Figure 1D:
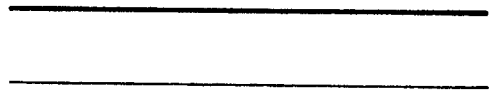
Figure 2A:
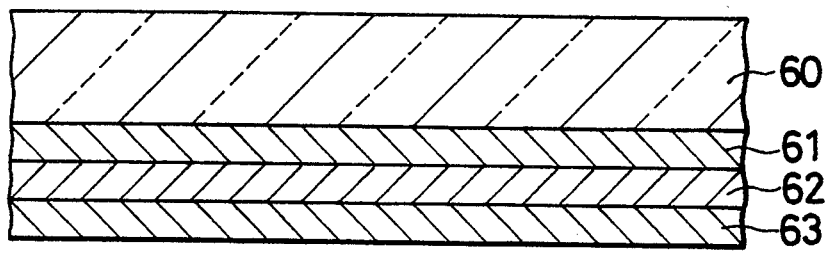
FIGS. 2A, 2B and 2C are diagrams illustrating an erasable type magneto-optical recording medium, a method for reproducing the recording medium and an effective reproducing region of the recording medium.
Figure 2B:
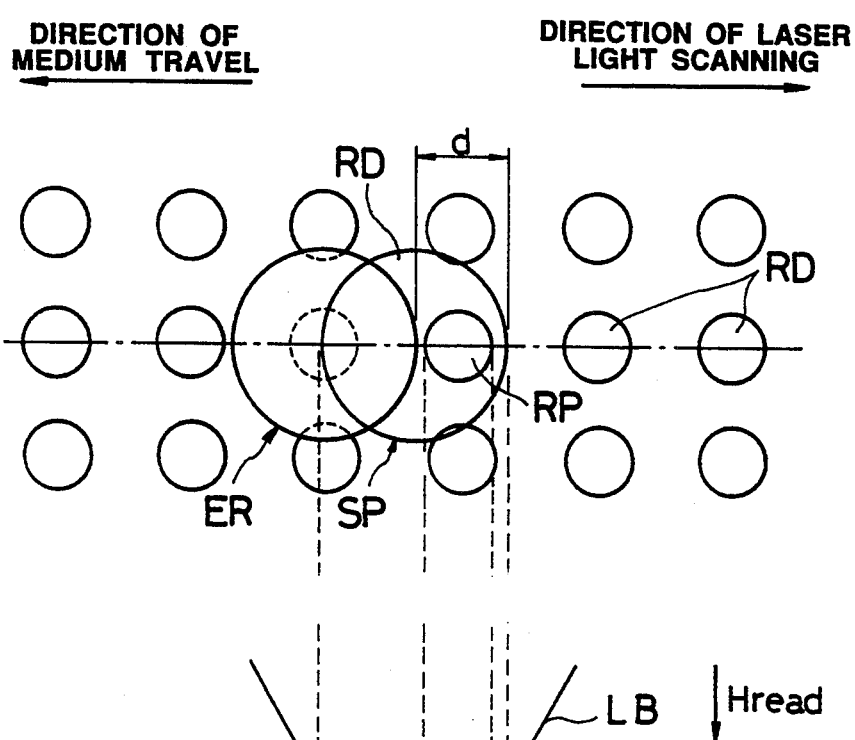
Figure 2C:
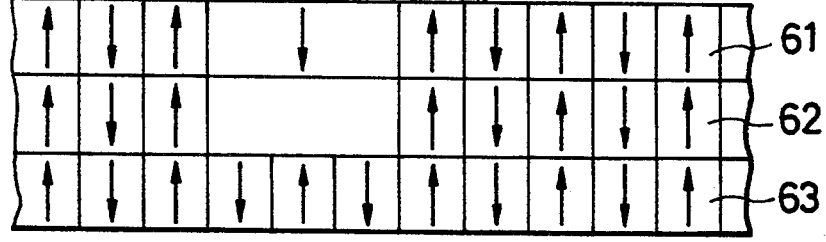
Figure 3A:
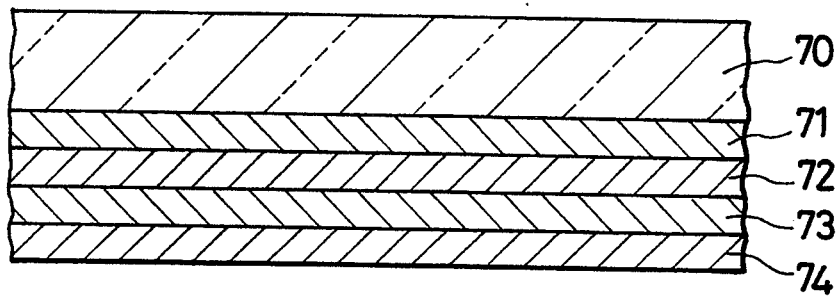
FIGS. 3A, 3B and 3C are diagrams illustrating a relief type magneto-optical recording medium, a method for reproducing the recording medium and an effective reproducing region of the recording medium.
Figure 3B:
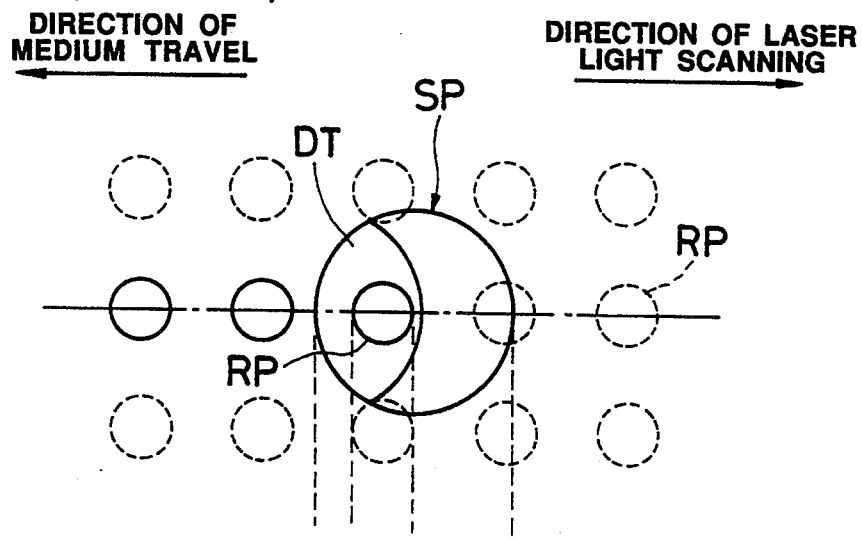
Figure 3C:
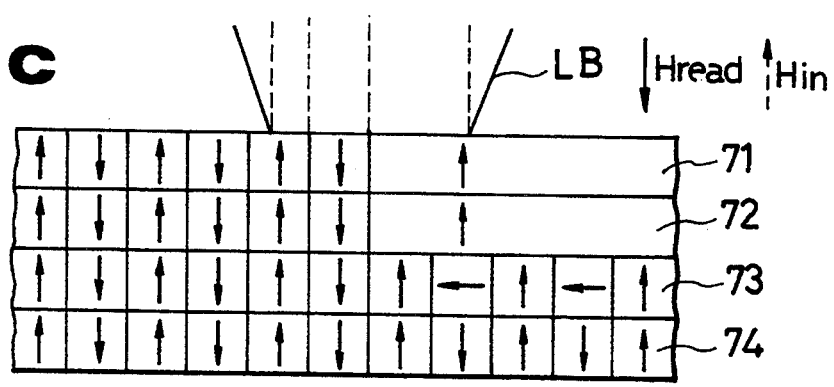
Figure 4A:
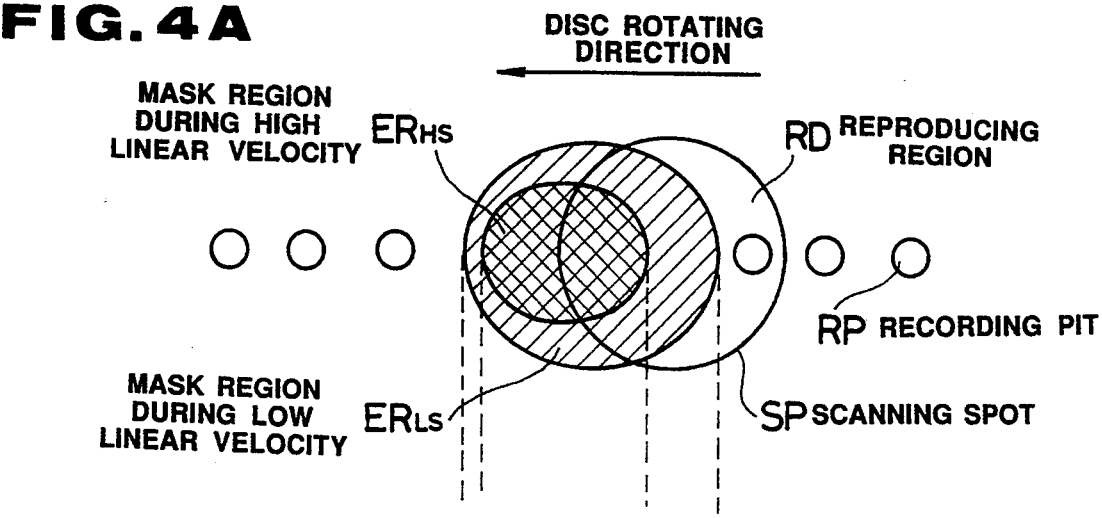
FIGS. 4A and 4B are diagrams illustrating that the effective reproducing region is changed with changes in the temperature of the magneto-optical recording medium.
Figure 4B:
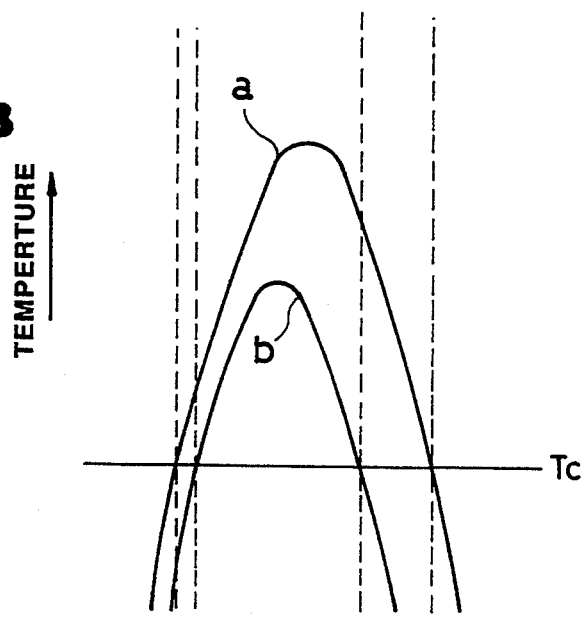

Referring to the drawings, certain embodiments of an optical recording medium according to the present invention will be explained. First, an embodiment in which the present invention is applied to a magneto-optical recording medium as a recordable medium, and then an embodiment in which the present invention is applied to a variable reflectance optical recording medium as a recordable medium, will be explained.

Figure 5:
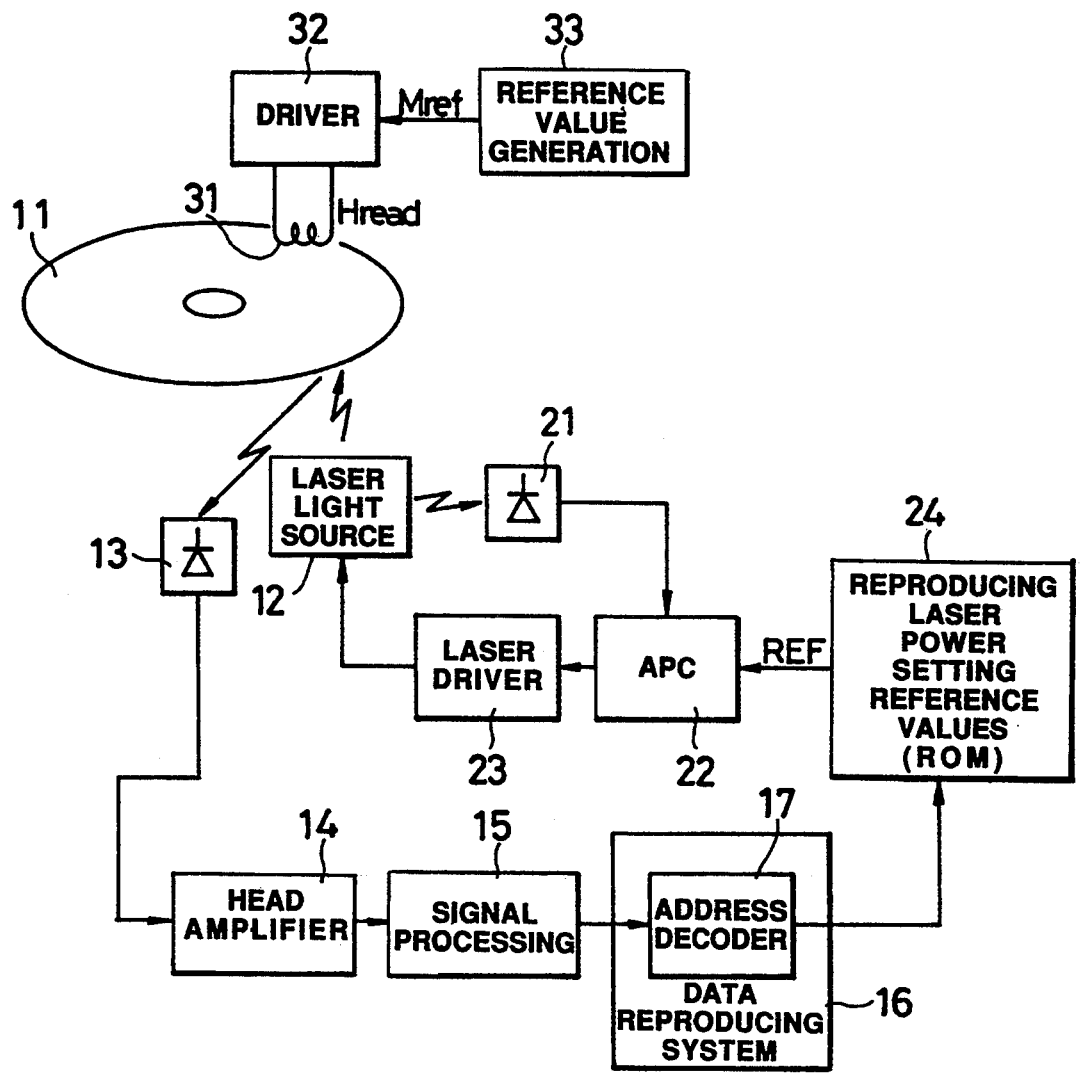
FIG. 5 is a block diagram showing essential parts of a disc reproducing apparatus to which an embodiment of the reproducing method for the magneto-optical recording medium according to the present invention is applied.

FIG. 5, a magneto-optical recording medium is a magneto-optical disc 11, to which the above-mentioned erasable type or relieved type reproducing method is applied. In this case, the magneto-optical disc 11 is rotationally driven in accordance with a constant angular velocity (CAV) system.

For example, the magneto-optical disc to which the erasable type reproducing method is applied has an exchange-coupled magnetic multilayer film structure composed of an amorphous rare earth (Gd, Tb)-iron group (Fe, Co) ferrimagnetic film for magneto-optical recording. The multilayer film structure is made up of a recording holding layer formed e.g. of TbFeCo with a Curie temperature of 300° C., an interrupting layer (intermediate layer) of e.g. TbFeCoAl with a Curie temperature T of 120° C. and a reproducing layer of e.g. GdFeCo with a Curie temperature of not lower than 400° C. The magneto-optical disc to which the relief type reproducing method is applied is such a disc in which the recording holding layer is formed of e.g. TbFeCo with a Curie temperature of 250° C., the intermediate layer is formed e.g. of GdFeCo with a Curie temperature of 250° C., the reproduction assistant layer is formed e.g, of TbFeCoAl with a Curie temperature of 120° C. and the reproducing layer is formed e.g. of GdFeCo with a Curie temperature of not lower than 300° C.

Figure 6:
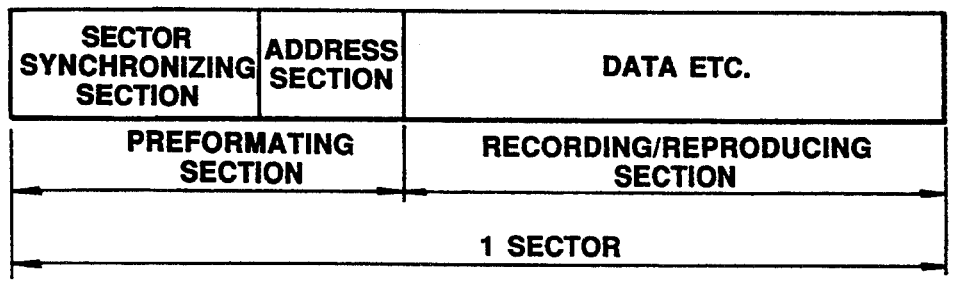
FIG. 6 is a block diagram showing a sector format for data recorded on a magneto-optical disc.

In this case, data are sequentially recorded as plural sectors per track. Each sector is arranged as shown for example in FIG. 6. That is, each sector is constituted by a preformating section and a recording reproducing section. In the preformating section, data are pre-recorded as pits on the magneto-optical disc 11. During recording, this preformating section is detected and data etc. are recorded only in the recording reproducing section.

The preformating section is made up of a sector synchronizing section and an address section. In the address section, address data including track addresses and sector addresses are recorded. The track addresses are serial numbers from e.g. the inner periphery of the disc as the recording start position, or track numbers, corresponding to the radial positions of the magneto-optical disc 11. The sector addresses indicate the serial numbers of the sectors in a given track.

In the present embodiment, the radial position of the optical pickup of the magneto-optical disc 11, that is the reproducing position, is detected by detecting the above-mentioned track address, and the laser beam power is controlled depending on the linear velocity at the reproducing position for maintaining the constant size of the reproducing region (readout region) for the erasable type reproducing method or the constant size of the reproducing region (signal detecting region) DT for the relief type reproducing method.

As a readout beam, a laser beam from a laser source 12, such as a semiconductor laser, is incident on the reproducing layer of the magneto-optical disc 11.

In the present embodiment, a reproducing magnetic field $H_{read}$ is generated by the driving current supplied to a magnetic field generating coil 31 from a driver 32. The magnetic field generating coil 31 is arranged facing the laser source 11 on the opposite side of the magneto-optical disc 11 with respect to the laser beam side. A reference value $M_{ref}$ from a reference value generating circuit 23 is supplied to the driver 22 and the strength of the reproducing magnetic field $H_{read}$ generated by the coil 21 is set so as to be a constant value conforming to this reference value.

In accordance with the above-mentioned erasable or relief type reproducing method, the reflected light from the reproducing region RD or DT within the beam spot of the laser beam is incident on a reproducing photodetector 13 by optical means, not shown, for photoelectric conversion.

Output signals of the photodetector 13 are supplied via a head amplifier 14 to a signal processing circuit 15 to produce RF signals which are supplied to a data reproducing system for demodulation.

Part of the laser beam from the laser source 12 is incident on a laser power monitoring photodetector 21. The photoelectrically converted output of the photodetector 21 is supplied to an automatic power controller 22, in which the output of the photodetector 21 and a reproducing laser power setting reference value REF are compared to each other. Outputs of the comparison error are supplied to a laser driving circuit 23 for controlling the output power from the laser source 12. By the above-described close-loop control, the output power of the laser light source 12 is controlled so as to conform to the reproducing laser power setting reference value REF.

In the present embodiment, the reproducing laser power setting reference value REF is adapted to conform to the linear velocity at each radial reproducing position of the magneto-optical disc 11, as will now be explained.

That is, there is provided a ROM 24 which stores a table of reproducing laser power setting reference values REF, associated in a one-for-one relationship to the linear velocities at the respective track positions of the magneto-optical disc 11. Such reproducing laser power setting reference values REF, which will give constant sizes of the above-mentioned effective reproducing region (readout region RD or signal detecting region DT) suitable for reproduction when the erasable type magneto-optical disc or the relief type magneto-optical disc is reproduced at the respective linear velocities at the respective reproducing track positions, are previously detected and stored in ROM 24.

Whether or not the size of the reproducing region RD or DT is of an optimum constant value may be detected depending on whether or not the RF signal level from the signal processing circuit 15 is of a predetermined value when the predetermined reference pattern information is reproduced.

In an address decoder 17 of a data reproducing system 16, track addresses are extracted from reproduced signals and discriminated. These track addresses are supplied to ROM 24 as readout addresses for ROM 24. Different values of the laser power setting reference values REF are read out depending on the linear velocities at the reproducing track positions. The read-out setting reference values REF are supplied to automatic power controller 22 whereby the output power of the laser light source 12 is controlled to conform to the setting reference values depending on the linear velocities at the reproducing positions on the magneto-optical disc 11.

As described above, if the radial reproducing positions on the magneto-optical disc 11 are changed, the temperature distribution related to the laser beam scanning spot is changed depending on the linear velocities of the disc at the reproducing position. If the laser output power is changed for the constant linear velocity of the magneto-optical disc 11, the size of the region at a temperature in excess of the predetermined threshold temperature TΘ is changed as shown at S1, S2 in FIG. 7. Thus, by controlling the laser power as described above, the constant size of the above-mentioned reproducing region RD or DT may be maintained despite changes in the linear velocity of the magneto-optical disc 11.

In this manner, even although the radial reproducing position of the magneto-optical disc 11 and hence the linear velocity is changed, the constant size of the reproducing region RD or DT in the erasable type or relief type reproducing method may be maintained by controlling the laser power to assure stable reproduction at all times.

Meanwhile, the circuit for generating the reproducing power setting reference values REF may be constituted by using, instead of ROM 24, a circuit adapted for finding the reproducing laser power setting reference value REF by processing the track address information.

Instead of changing the laser power setting reference values for the respective tracks, each one laser power setting reference value may be associated with each set of plural tracks. In this case, a laser power setting reference value associated with a linear velocity at a central track of the plural tracks may be used as a laser power setting reference value for the track set.

Although the laser power is controlled in the above embodiment for rendering the size of the reproducing regions RD and DT constant despite changes in the temperature of the magneto-optical disc, similar effects may also be achieved by controlling the external magnetic field (reproducing magnetic field $H_{read}$).

That is, with the erasable type reproducing method, for example, the temperature at which the mask region (recording erased region) ER starts to be generated is precisely not the Curie temperature $T_{c2}$ of the intermediate layer 62, but is correlated with the reproducing magnetic field $H_{read}$, and is a temperature such that $$H_{c1} + H_W < H_{read} \qquad (1)$$

wherein $H_{c1}$ is coercivity of the reproducing layer 61 and $H_W$ is the exchange-coupling force between layers 61 and 63. The exchange-coupling force $H_W$ between the reproducing layer 61 and the recording layer 63 is decreased with a rise in temperature and becomes equal to zero at the Curie temperature $T_{c2}$ of the intermediate layer 62.

Figure 7:
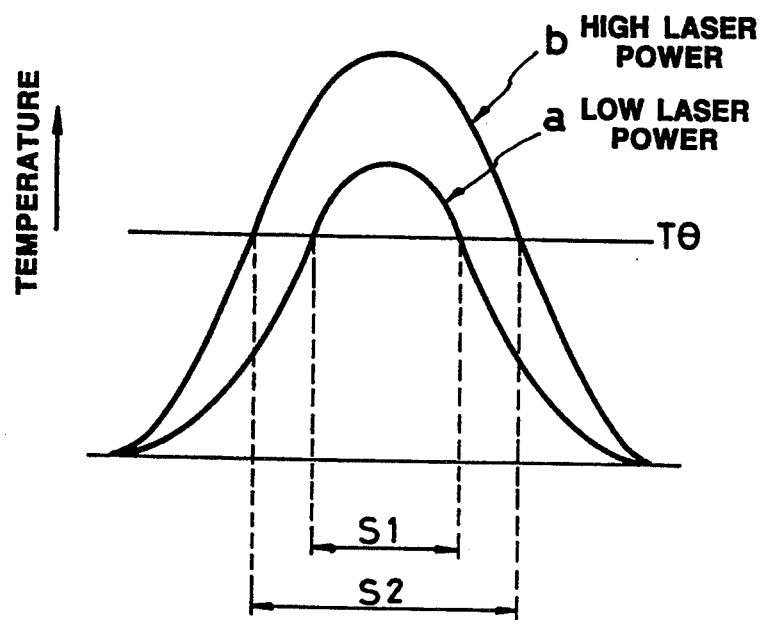
FIG. 7 is a view for illustrating that a mask region is changed by changing a laser power.
Figure 8:
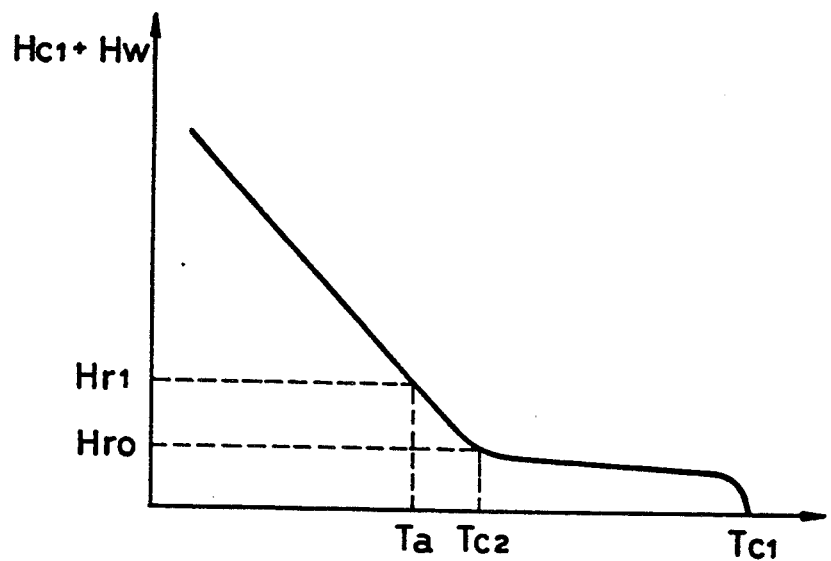
FIG. 8 is a view for illustrating that a mask region is changed by changing an external magnetic field.

FIG. 8 shows temperature characteristics of $H_{c1} + H_W$. In FIG. 7, $T_{c1}$ is the Curie temperature of the reproducing layer 61. At a temperature higher than the Curie temperature $T_{c2}$ of the intermediate layer, coercivity is similar to that for a sole reproducing layer.

For aligning the domains of the reproducing layer 61 of the magneto-optical disc, it suffices to apply a magnetic field larger than $H_{c1} + H_W$, as shown by the formula (1). Therefore, if $H_{r0}$ is applied as reproducing magnetic field $H_{read}$ in FIG. 8 for the same temperature distribution, the region at a temperature higher than the Curie temperature $T_{c2}$ becomes the mask region ER. However, if the strength of the reproducing magnetic field $H_{read}$ is $H_{rl}$, the range up to a temperature $T_a$ lower than the Curie temperature $T_{c2}$ becomes the mask region ER. In this manner, the size of the mask region is changed with the strength of the reproducing magnetic field $H_{read}$, so that the reproducing region RD is changed in size.

Therefore, by changing the external magnetic field, such as the reproducing magnetic field $H_{read}$, depending on the temperature of the magneto-optical disc 11, the reproducing region may perpetually be rendered constant.

The reproducing magnetic field may similarly be controlled in the case of the relief type reproducing method for rendering the size of the reproducing region DT constant.

Figure 9:
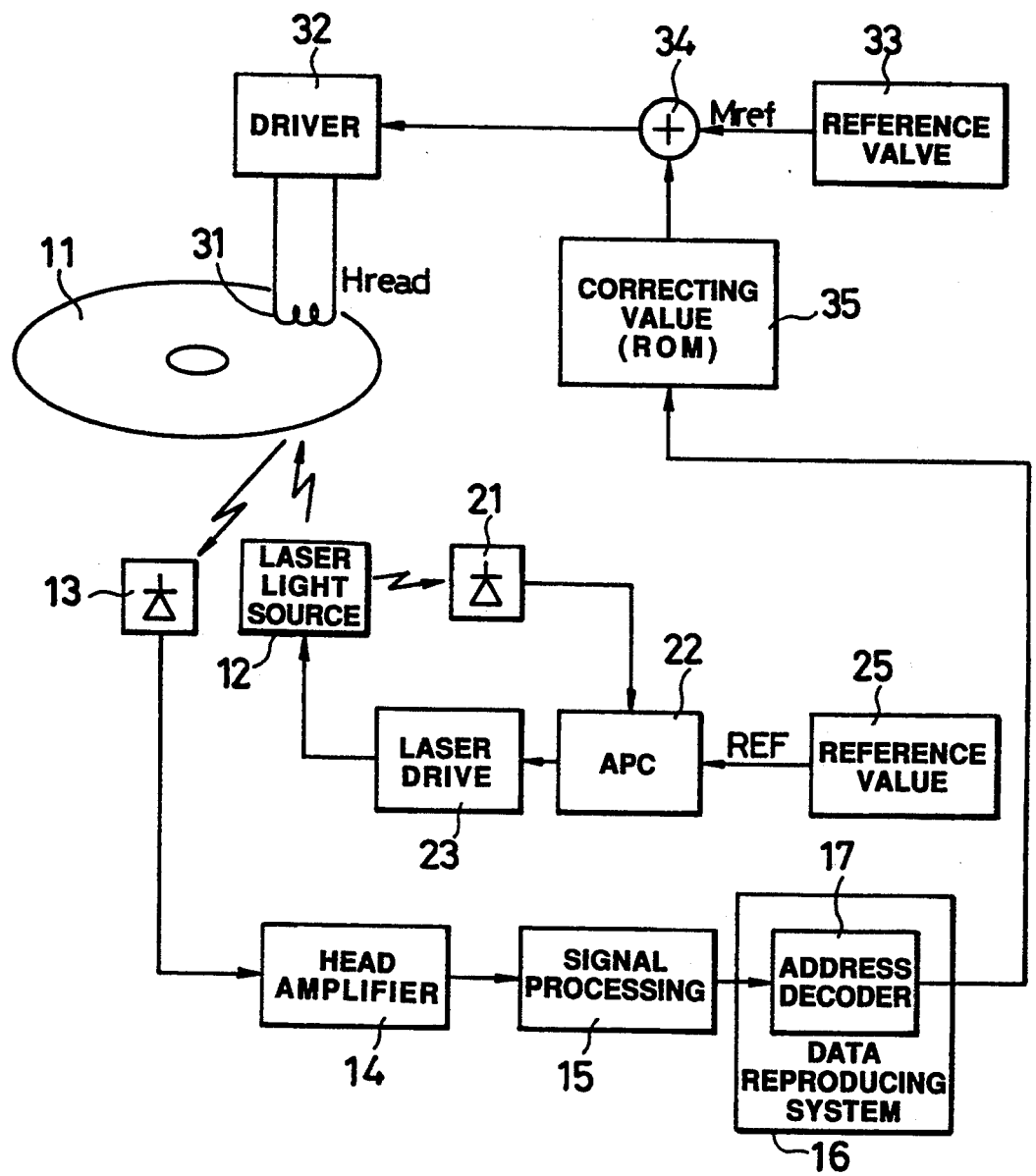
FIG. 9 is a block diagram showing essential parts of a disc reproducing apparatus to which another embodiment of the reproducing method for the magneto-optical recording medium according to the present invention is applied.

FIG. 9 shows an embodiment of essential parts of a reproducing apparatus in which the reproducing magnetic field is controlled depending on the linear velocity of the magneto-optical disc. Similarly to the preceding embodiment, the magneto-optical disc 11 is control led with constant angular velocity (CAV) system.

In the present embodiment, the constant laser power setting reference value REF from a reference value generator 25 is supplied to the automatic power controlling circuit 22 and an output laser power of the laser light source 12 is controlled to a constant value conforming to this reference value REF.

A reference value $M_{ref}$ from reference value generator 33 is supplied to an adder 34 where it is added to a correction value from a ROM adapted for generating correcting values 35. A driving signal consisting in the produced sum value is supplied to a driver 32. Thus the strength of the reproducing magnetic field $H_{read}$ is of a predetermined value conforming to the reference value REF, if the correcting value is zero, so that the strength is changed around the predetermined value depending on the correcting value.

In the present embodiment, ROM 35 stores a table of the correcting values conforming to the linear velocities of the magneto-optical disc 11 at the reproducing positions. Track addresses from the address decoder 17 are entered as readout addresses of ROM 35. In the present embodiment, the correcting values stored in ROM 35 are of such values that the sizes of the reproducing regions RD and DT become perpetually constant for respective linear velocities of the magneto-optical disc 11 which are different with different radial reproducing positions of the magneto-optical disc 11.

Whether or not the size of the reproducing region RD and Dt is constant may again be detected depending on whether or not the RF signal level from signal processor 15 is of a constant value when the information of a predetermined reference pattern is reproduced.

In this manner, track addresses are detected from playback signals by the address decoder 17 during reproduction. Based on these track addresses, the correcting values conforming to the linear velocities at the reproducing positions are read out from ROM 35 so as to be supplied to an adder 34. This controls the strength of the reproducing magnetic field $H_{read}$ to render the size of the reproducing region RD or DT constant at all times.

Meanwhile, a circuit for calculating the correcting values from the information concerning the detection temperature from the temperature sensor may be used as the correcting value generator in place of ROM 35.

As in the above mentioned embodiment the laser power and the external magnetic field may also be controlled simultaneously, in place of independently controlling the laser power and the external magnetic field depending on linear velocities of the magneto-optical disc at the reproducing positions.

Although the reproducing positions, that is radial positions of the optical pickup during reproduction on the magneto-optical disc 11, are detected in the above-described embodiment by extracting track addresses in the playback signals, the optical pickup position may also be detected by a position sensor.

Figure 10:
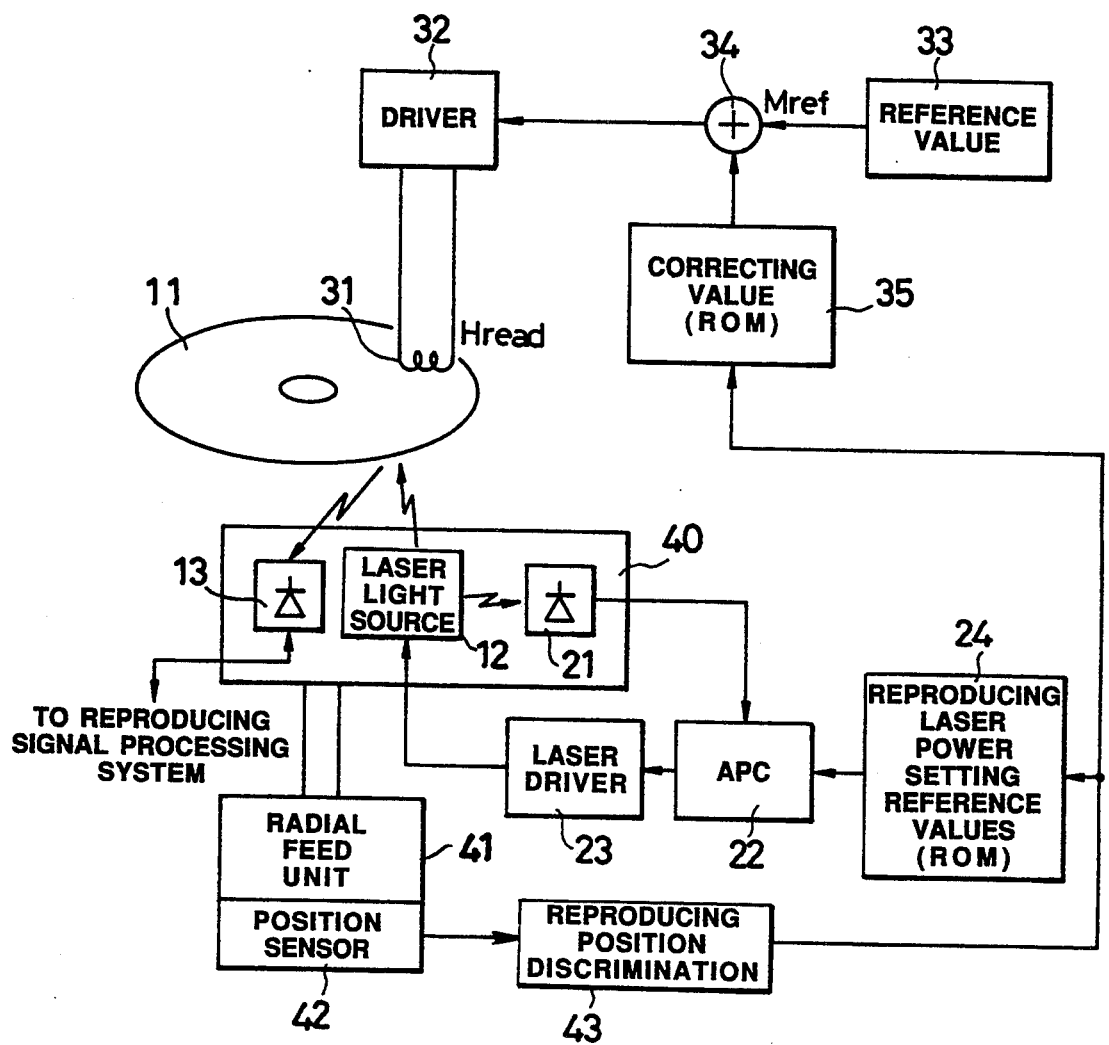
FIG. 10 is a block diagram showing essential parts of a disc reproducing apparatus to which a still another embodiment of the reproducing method for the magneto-optical recording medium according to the present invention is applied.

In an embodiment for the latter case, shown in FIG. 10, both the laser power and the reproducing magnetic field are controlled simultaneously.

In this figure, an optical pickup 40 is provided with a laser light source 12, photodetectors 13 and 21 and an optical system, not shown, and is adapted for being slid along the radius of the magneto-optical disc 11 by a radial translation unit 41.

A position sensor 40, such as a potentiometer, is provided in the radial feed unit 41. The position of the laser beam scanning spot from the optical pickup 42 along the radius of the magneto-optical disc 11, that is the reproducing position, may be detected by the position sensor 42. An output of the position sensor 42 is supplied to a reproducing position discriminating circuit 43. An output from the reproducing position discriminating circuit 43, indicating the reproducing position on the magneto-optical disc 11, is supplied as readout addresses to the ROM 24 adapted for producing the reproducing laser power setting reference values and to the ROM 35 adapted for producing correcting values for correcting the reproducing magnetic field $H_{read}$.

In the present embodiment, ROMs 24 and 35 store sets of the laser power setting reference values REF and the correcting values which are associated with different linear velocities and which will give constant sizes of the reproducing region RD or DT even although the linear velocities at the respective reproducing positions are changed.

The laser power and the reproducing magnetic field may be controlled in this manner depending on the linear velocities at the reproducing positions, such that, similarly to the above-described embodiment, reproduction may be achieved by the light reflected from the reproducing region RD or DT of the constant size at any reproducing position of the magneto-optical disc 11 to assure stable reproduction at all times.

In the present embodiment, the radial extent of the magneto-optical disc 11 may also be divided into plural ranges and a set of the laser power setting reference values REF and the correcting values may be associated in a one-for-one relationship with a representative linear velocity for each range so that a different value of the set may be read from ROMs 24 and 35 for each range.

Similarly to the preceding embodiment, a processing circuit for finding the reproducing laser power setting reference value REF and the correcting value from the information concerning the radial position from the position sensor 42 may also be employed in place of the ROMs 24 and 35.

Although the magneto-optical disc is rotationally driven by a constant angular velocity (CAV) system, the present invention may also be applied to a so-called modified CAV rotational driving system.

Figure 11:
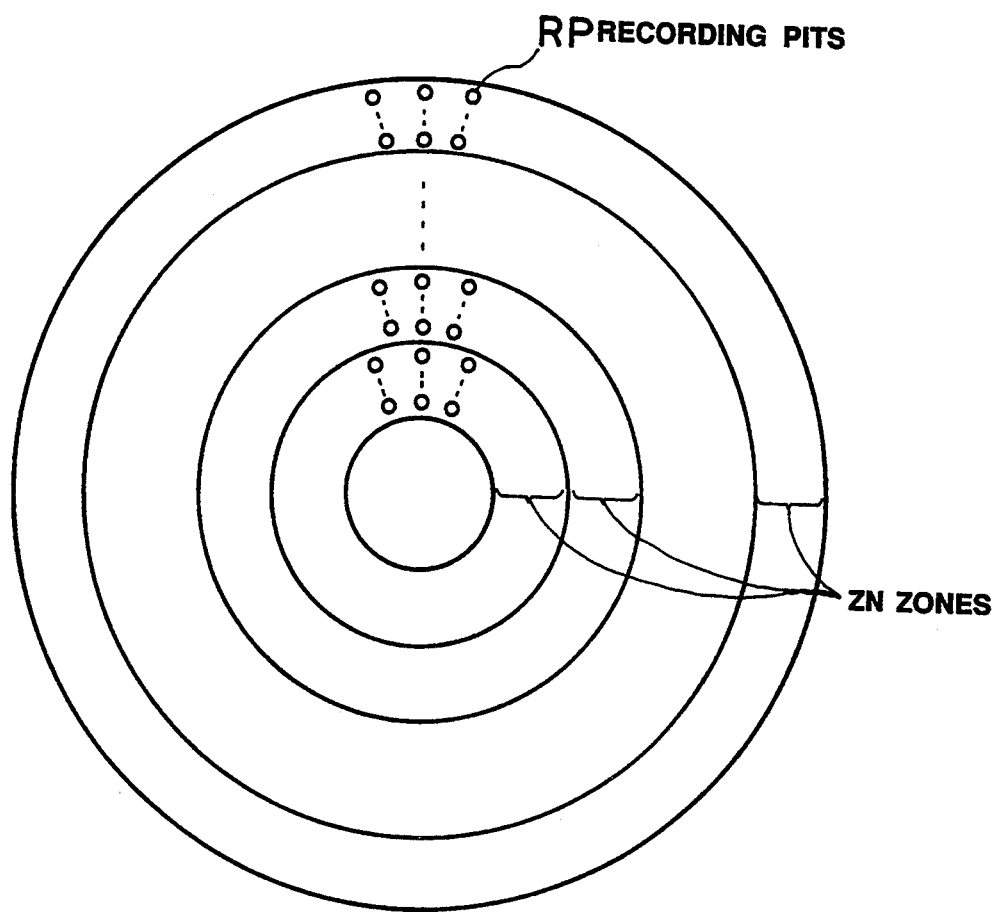
FIG. 11 is a view for illustrating a magneto-optical disc of the modified CAV rotating driving system.

That is, although the CAV system is employed in the magneto-optical disc of the modified CAV system, the radial extent of the disc is divided into plural zones ZN, as shown in FIG. 11, and recording/reproduction is performed using data clock frequencies which are varied from one zone to another in such a manner as to render the linear recording density in each zone ZN from the inner periphery towards the outer periphery substantially constant to increase the recording density.

Although the linear recording density of the recording pits RP is changed in each zone ZN, changes in the linear recording velocities may be substantially disregarded with respect to the clock frequencies.

Meanwhile, the recording density may be increased by adopting the constant linear velocity (CLV) system as the rotating driving system. However, since it is necessary with CLV to change the number of revolutions depending on the track positions of the magneto-optical disc, control of the number of revolutions of the spindle motor is complicated during data accessing to lower the accessing speed. With the modified CAV system, the rotational driving may be achieved by CAV to raise the accessing speed to improve the recording density to achieve high speed data accessing.

However, since the magneto-optical disc is rotated at a constant number of revolutions, the linear velocities become different depending on the reproducing positions along the disc radius and hence the sizes of the effective reproducing region RD or DT become different, as in the preceding embodiment.

In this consideration, with the reproducing apparatus for the magneto-optical disc of the modified CAV rotating and driving system, the laser power and/or the reproducing magnetic field is controlled in accordance with the linear velocity at the reproducing position to render the size of the reproducing region constant to effect stabilized reproduction. With the present modified CAV system, since the information concerning which of the zones counted from e.g. the inner periphery of the disc is the current zone is written in data, the radial position of the current zone may be detected from the zone information and a linear velocity may be presupposed from one zone to another on the basis of the zone information for performing the above-mentioned control of the laser power or the reproducing magnetic field.

It is seen from above that, by combining the modified CAV rotating and driving system with the erasable or relief type reproducing methods, recording/reproduction may be achieved with a higher density than that achieved by employing the CAV rotating and driving system. Besides, a higher accessing speed than that achieved with CLV may be achieved by applying the reproducing method of the present invention to a magneto-optical disc for data recording.

The present invention may also be applied to a magneto-optical disc of the type consisting in a mixture of the erasable and relief types.

With the high density reproducing technology employing these magneto-optical recording media, recording pits may be read only from reproducing regions narrower than the beam spot area. Besides, the effective size of the reproducing region may perpetually be rendered constant despite changes in the linear velocities of the recording media to provide for stable reproduction. The result is that high density may be achieved to increase the capacity of the recording medium to produce high quality reproducing signals at all times.

The above embodiments are directed to a recordable magneto-optical recording medium. The following description is made of an embodiment in which the present invention is applied to a variable reflectance magneto-optical recording medium.

As the technique concerning the variable reflectance optical recording medium, the present Applicant has already proposed a signal recording method for an optical disc in the specification and drawings of Japanese Patent Application No. H-2-94452 (1990), and an optical disc in the specification and drawings of Japanese Patent Application NO. H-2-291773 (1990). In the former, a signal reproducing method for an optical disc is disclosed, whereby a readout light is radiated to an optical disc on which phase pits are formed depending on signals and which has reflectance values changed with temperatures, and the phase pits are read while the reflectance is partially changed within a scanning light spot of the readout beam. In the latter, an optical disc of a so-called phase change type is disclosed, in which a layer of a material changed in reflectance with phase changes is formed on a transparent substrate which has reflectance values changed with phase changes and in which, when the disc is irradiated with the readout beam, the layer partially undergoes phase changes within the scanning spot of the readout beam and is reset after readout is terminated.

The material of the layer is preferably such a material in which a layer of a phase change material which may be crystallized after being melted and in which, when the layer is irradiated with the readout beam, the material is changed into a liquid phase within the scanning spot of the readout beam within the melted and crystallized region so as to be changed in reflectance and is reset to a crystallized state after readout is terminated.

Figure 12:
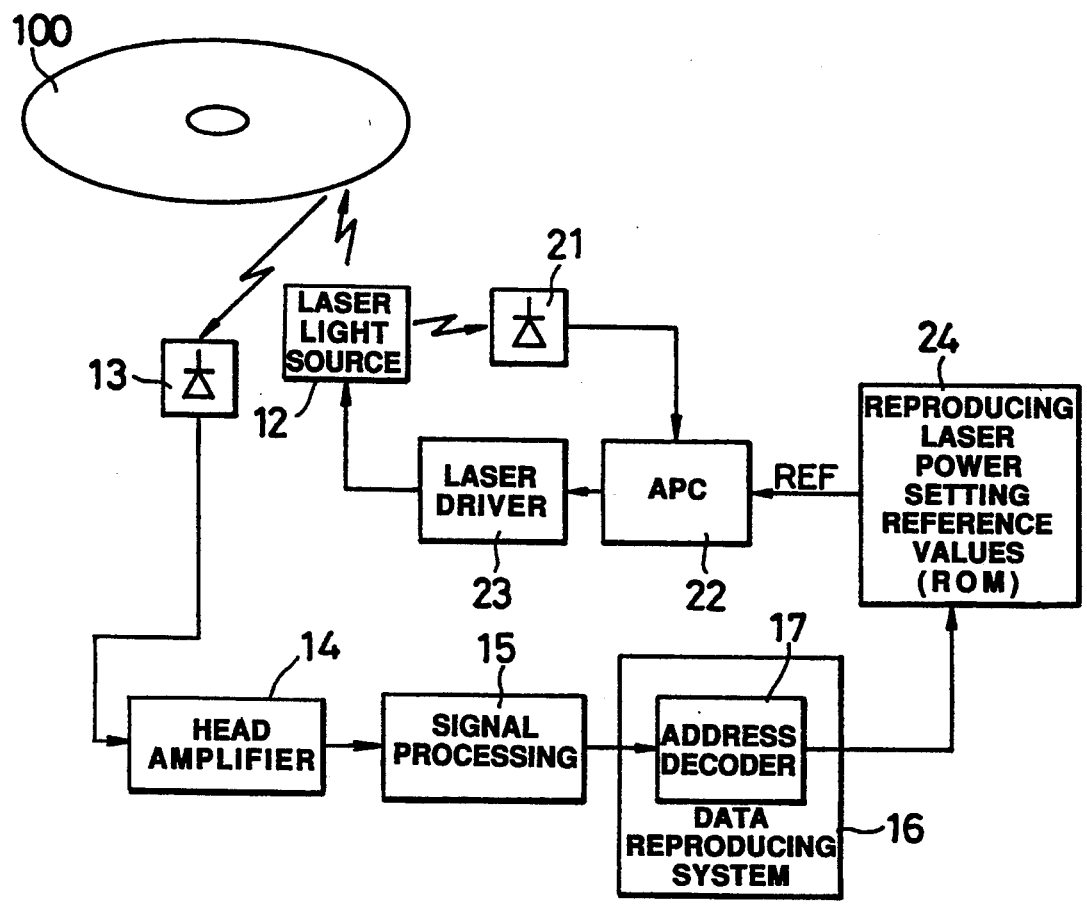
FIG. 12 is a block diagram showing essential parts of a disc reproducing apparatus to which another modified embodiment of the reproducing method for a magneto-optical disc according to the present invention is applied.

FIG. 12 shows essential parts of a disc reproducing apparatus to which is applied a modified embodiment of the reproducing method of the present invention employing the variable reflectance type optical recording medium, above all, the phase change type optical disc.

In FIG. 12, an optical disc 100 is a variable reflectance type optical disc, above all, a phase change type optical disc. The disc in which the reflectance of a portion thereof irradiated with the readout laser beam and raised in temperature is lower than that of the remaining portion corresponds to the erasable type magneto-optical disc, while the disc in which the reflectance of a portion thereof raised in temperature is higher than that of the remaining portion corresponds to the relief type magneto-optical disc. The present embodiment is applicable not only to both types of the phase change type optical discs, but also to variable reflectance type optical discs based on another operating principle.

The arrangement shown in FIG. 12 is the same as that shown in FIG. 5 except that the magnetic field generating coil 21, driver 22 and the reference value generator 33 are eliminated and a variable reflectance type optical disc 100 is used in place of the magneto-optical disc 11.

That is, in the present embodiment, the optical pickup 20 position of the reflectance type optical disc 100, that is the reproducing position, is detected by detecting the above-mentioned track address, and the laser beam power is controlled in accordance with the linear velocity at the reproducing position to control the size of the portion within the beam spot of the laser beam where reflectance is changed to maintain the constant size of the high reflectance portion at all times within the beam spot which is the effective reproducing region.

That is, a light beam from the laser light source 12 is incident on the optical disc 100 and the beam reflected from a reproducing region within the laser beam spot is incident on a reproducing photodetector 13 to undergo photoelectric conversion while output signals from photodetector 13 are supplied by means of head amplifier 14 to signal processor 15 to produce RF signals which are supplied to a data reproducing system for demodulation.

Part of the laser beam from the laser light source 12 is incident on a photodetector 16 for laser power monitoring to undergo photoelectric conversion before being supplied to the automatic power controller 17. In the automatic controller 17, an output of the photodetector 16 and the reproducing laser power setting reference value REF are compared to each other. A comparison error output from controller 17 is supplied to laser driving circuit 23 for controlling the output power of the laser light source 12.

Part of the laser beam from the laser light source 12 is incident on the laser power monitor photodetector 21. By means of the above-mentioned closed loop control, the photoelectrically converted output of photodetector 21 is controlled so that the output power of the laser light source 12 is equal to a value conforming to the reproducing laser power setting reference value REF. The setting reference value REF is set so as to conform to the linear velocity at each reproducing position along the radius of the variable reflectance optical disc 100.

To this end, a ROM 24 is provided for storing a table of reproducing laser power setting reference values REF associated in a one-for-one relation to the linear velocities at the track positions of the optical disc 100. In this case, such reproducing laser power setting reference values REF which will give at all times constant sizes of the effective reproducing region of the optical disc 100 most proper for reproduction for the states of the linear velocities for the respective reproducing track positions are previously detected and stored in the ROM 24. Whether the size of the reproducing region is of an optimum constant size may be detected depending on whether or not the RF signal level from signal processor 15 is of a predetermined value when the information of e.g. a predetermined reference pattern is reproduced.

In the address decoder 17 of the data reproducing system 16, track addresses are extracted from playback signals and discriminated. These track addresses are supplied as readout addresses to the ROM 24. Different values of the reproducing laser power setting values REF are read out from the ROM 24 depending on different linear velocities at the reproducing track positions. The read-out setting reference values REF are supplied to an automatic power controller 22 for controlling the output power of the laser light source 12 so as to conform to the setting reference value REF in accordance with the linear velocity at the current reproducing position on the optical disc 100.

In the case of the variable reflectance type optical disc 100, as in the above-described magneto-optical disc, if the reproducing position along the radius of the optical disc 100 is changed the temperature distribution for the laser beam scanning spot is changed with the linear velocity of the disc at the current reproducing position. By controlling the laser power in the above-described manner, the size of the reproducing region may be maintained constant although the linear velocity at the reproducing position of the magneto-optical disc 11 is changed. It will be seen from above that, even if the reproducing position along the radius of the variable reflectance type optical disc 100 and hence the linear velocity is changed, the reproducing region may be maintained at a constant size by controlling the laser power, so that stable reproduction may be achieved at all times.

The embodiment shown in FIG. 12 may be modified in the same manner as when employing the magneto-optical disc. For example, the readout beam may be controlled in intensity on the basis of the linear velocity with disc rotation, or the size of the portion within the beam spot in which reflectance is changed on the basis of the level of the signal read out from the optical recording medium. The setting values may also be found by processing instead of by using the ROM 24. The present invention may also be applied to the case of using the above-mentioned modified CAV rotating and driving system.

As an example of the optical disc 100 of the variable reflectance type employed in the embodiment of FIG. 12, a phase change type disc is explained, in which a layer of a phase change material which may be crystallized after melting is used and in which, when the layer of the phase change material is irradiated with the readout beam, the layer is partially liquefied in a melted and crystallized region within the readout beam spot so as to be changed in reflectance, with the thus liquefied layer being reverted to the crystal state after readout is terminated.

Figure 13:
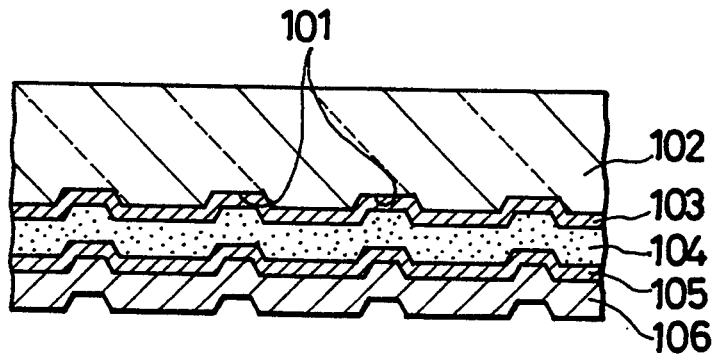
FIG. 13 is a schematic cross-sectional view showing essential parts of an example of a phase change type optical disc as typical of a variable reflectance optical disc employed in the embodiment shown in FIG. 12.

Referring to a schematic cross-sectional view of FIG. 13, showing the phase change type optical disc, used as the optical disc 100 shown in FIG. 12, a layer of a phase change material 104 is formed via a first dielectric layer 103 on a transparent substrate 102 on which phase pits are formed (on the lower side in the drawing), a second dielectric layer 105 is formed on the layer 104 (on the lower side in the drawing, hereinafter the same) and a reflecting layer 106 is formed on the second dielectric layer. Optical characteristics, such as reflectance, are set by these first and second dielectric layers 103 and 105.

If necessary, a protective layer, not shown, may be additionally deposited on the reflecting layer 106.

Figure 14:
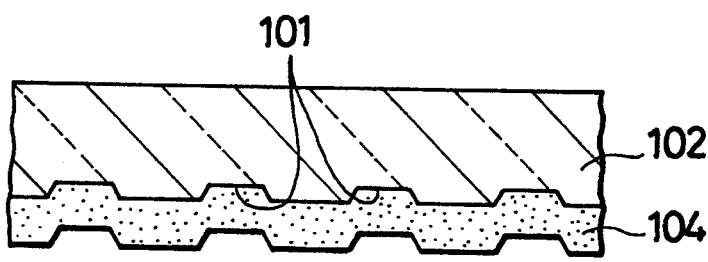
FIG. 14 is a schematic cross-sectional view showing another example of the phase change type optical disc.
Figure 15:
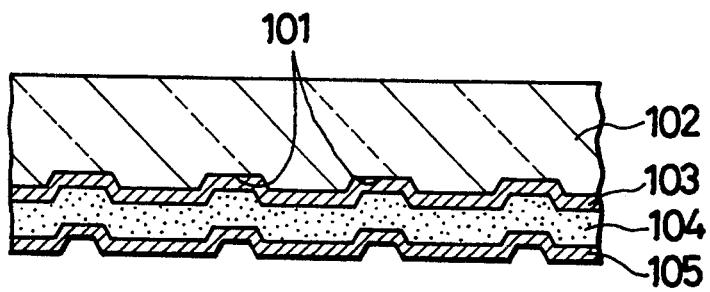
FIG. 15 is a schematic cross-sectional view showing still another example of the phase change type optical disc.

As alternative constitutions of the phase change type optical discs, only the phase change material 104 may be intimately deposited directly on the transparent substrate 102 on which pits are formed, as shown in FIG. 14, or a first dielectric layer 103, a phase change material layer 104 and a second dielectric layer 105 may be sequentially formed on the transparent substrate 102 on which phase pits are formed, as shown in FIG. 15.

The transparent substrate 102 may be a substrate of synthetic resin, such as polycarbonate or methacrylate, or a glass substrate. Alternatively, a photopolymer layer may be deposited on the substrate and phase pits 101 may be formed by a stamper.

The phase change material may be such material which undergoes partial phase changes within a scanning spot of the readout beam and is reset after readout and the reflectance of which is changed with phase changes. Examples of the material include calcogenites, such as $Sb_2Se_3$, $Sb_2Te_3$, that is calcogen compounds, other calcogenites or unitary calcogenites, that is calcogenitic materials, such as Se or Te, calcogenites thereof, such as BiTe, BiSe, In—Se, In—Sb—Te, In—SbSe, In—Se—Tl, Ge—Te—Sb or Ge—Te. If the phase change material phase 104 is constituted by calcogen or calcogenite, its characteristics, such as heat conductivity or specific heat, may be rendered desirable for providing a satisfactory temperature distribution by the laser readout beam. Besides, the melted state in the melted and crystallized region as later explained may be established satisfactorily to generate ultra-high resolution with high S/N or C/N ratio.

The first dielectric layer 103 and the second dielectric layer 105 may be formed of, for example, $Si_3N_4$, SiO, $SiO_2$, AlN, $Al_2O_3$, ZnS or $MgF_2$. The reflective layer 106 may be formed of Al, Cu, Ag or Au, admixed with minor amounts of additives, if desired.

As a concrete example of the phase change type optical disc, an optical disc having an arrangement shown in FIG. 13 is explained. With this optical disc, a layer of a material which may be crystallized after being melted is formed on a transparent substrate on which phase pits are previously formed. When a readout beam is radiated, the layer of the phase change material is partially liquefied in a melted and crystallized region within the readout scanning light spot and is reset to the crystallized state after readout of a crystallized state.

A so-called glass 2P substrate was used as the transparent substrate 102 of FIG. 13. Phase pits 101 formed on a major surface of the substrate 102 were of a track pitch of 1.6 μm, a pit depth of about 1200 Å and a pit width of 0.5 μm. A first dielectric layer 103 of AlN was deposited on one major surface of the transparent substrate 102 having these pits 101, to a thickness of 900 Å, and a layer of a phase change material 104 of $Sb_2Se_3$ was deposited on the layer 103 (on the lower surface thereof in FIG. 13, hereinafter the same). A second dielectric layer 105 of AlN was deposited thereon and an Al reflective layer 106 was deposited thereon to a thickness of 300 Å.

The following operation was performed on a portion of the optical disc free from recorded signals, that is a mirror-surface part thereof free from phase pits 101.

A laser beam of e.g. 780 nm was radiated to be focused on a point of the optical disc, which was then initialized by being allowed to cool gradually. The same point was then irradiated with a laser pulse with a laser power P set to $0 < P \leq 10$ mW. The pulse width was set to 260 nsec $\leq t \leq 2.6$ μsec. The result is that, if the reflectance is changed between two solid phase states before pulse irradiation and after pulse irradiation followed by cooling to room temperature, the layer is changed from a crystal state to an amorphous state. If the reflectance is not changed during this operation, but the amount of return light is once changed during irradiation of the pulse light, it is an indication that the film of the crystal state is once liquefied and re-crystallized. The region in the melted state which has once become liquid and which may be returned to the crystallized state with lowering of temperature is termed a melted and crystallized region.

Figure 16:
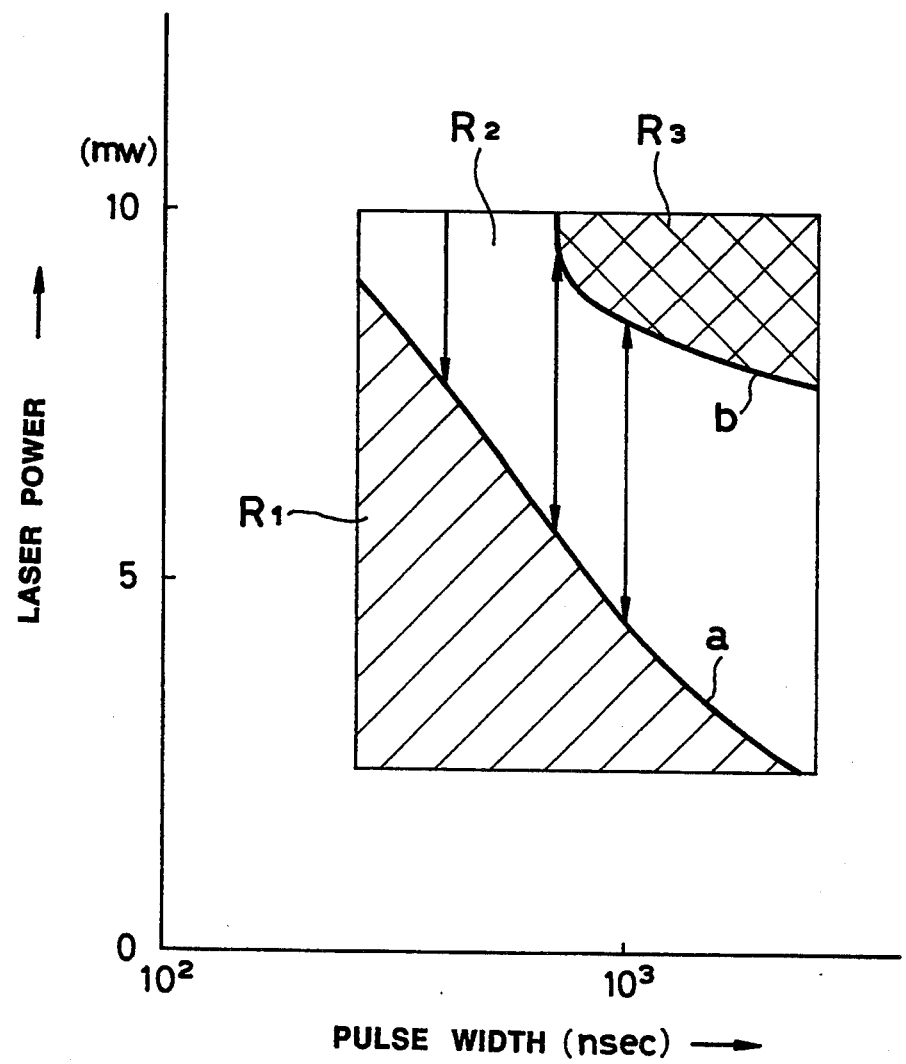
FIG. 16 is a view showing a phase change state for explanation of the above-mentioned phase change type optical disc.

FIG. 16 shows the phase states of the layer of the phase change material 104 of $Sb_2Se_3$ and values of a pulse width of the radiated laser pulse and the laser beam power plotted on the abscissa and on the ordinate, respectively. In this figure, a hatched area $R_1$ below a curve a indicates a region in which the layer of the phase change material 104 is not melted, that is maintained in its initial state. In this figure, the region above curve a becomes liquid, that is melted, on laser spot irradiation. A region between curves a and b is a melted and crystallized region which is reset to a crystal state when cooled to about the ambient temperature by elimination of the laser beam spot and thereby turned into a solid phase. Conversely, a hatched region $R_3$ above curve b is a melted amorphous region which is rendered amorphous when cooled and turned into a solid phase by elimination of the laser beam spot.

In the present embodiment, the reproducing laser power, optical disc constitution, material type and the film thicknesses are selected so that, in the course of cooling to ambient temperature from the heated state caused by readout beam radiation during reproduction, the time Δt which elapses since the heated state brought about by radiation of the readout beam during reproduction until cooling to ambient temperature becomes longer than the time necessary for crystallization, so that the state of liquid phase in the melted and crystallized region $R_2$ in FIG. 16 will be produced during reproduction.

In the present embodiment, the reflectance in the initial state, that is in the crystallized state, was 57%, whereas that in the melted state was 16%. When reproduction was performed with the playback power of 9 mW and the linear velocity of 3 m/sec, the ratio C/N was 25 dB.

Figure 17:
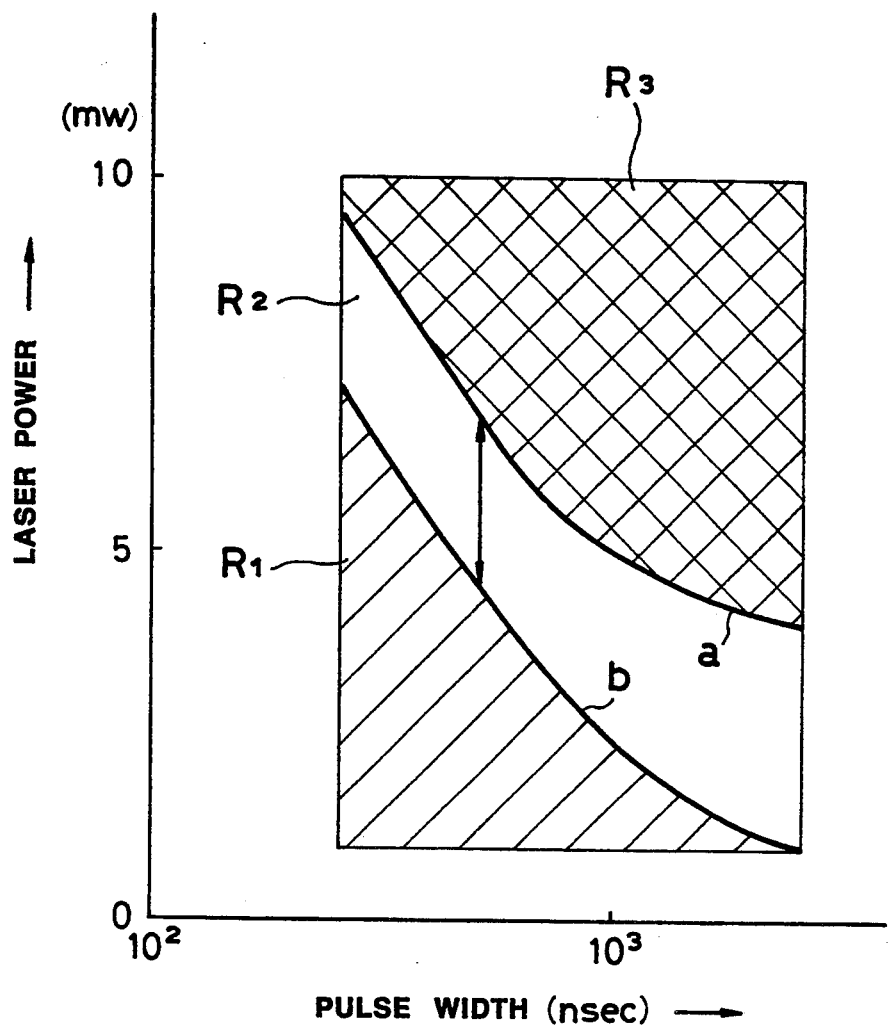
FIG. 17 is a view showing another phase change state for explanation of the above-mentioned phase change type optical disc.

FIG. 17 shows the results of measurement of the phase change states for another example of the phase change type optical disc making use of $Sb_2Te_3$ as a phase change material 104, similarly to FIG. 16. In FIG. 17, the parts corresponding to those of FIG. 16 are indicated by the same reference numerals. In the present example, making use of $Sb_2Te_3$, the reflectance in the crystallized state, that is initial state, was 20%, while that in the melted state was 10%.

Meanwhile, with calcogenites or chalcogens, such as $Sb_2Se_3$ or $Sb_2Te_3$, the reflectance for the amorphous state is substantially equal to that in the melted state. The optical disc employed in the present embodiment is reproduced with an ultra-high resolution by taking advantage of temperature distribution within the scanning spot on the optical disc.

Figures 18A, 18B:
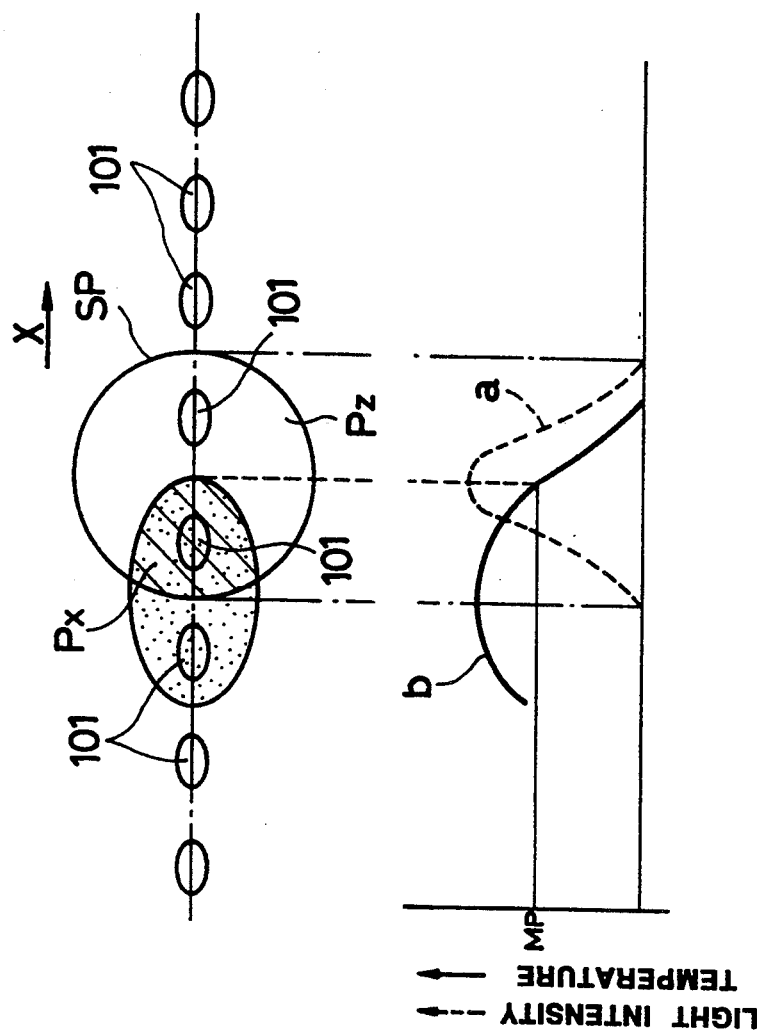
FIGS. 18A and 18B are diagrams showing the relation between the temperature distribution and a readout light spot for explanation of the above-mentioned phase change type optical disc.

Referring to FIGS. 18A and 18B, explanation is given of the case i which a laser beam is radiated on the phase change type optical disc.

In FIG. 18B, the abscissa indicates a position of the light spot relative to the scanning direction X. A beam spot SP formed on the optical disc on laser beam radiation has a light intensity distribution as indicated by a broken line a. On the other hand, temperature distribution in the layer of the phase change type material 104 is shifted slightly rearward relative to the beam scanning direction X, as indicated by a solid line b, in association with the scanning speed of the beam spot SP.

If the laser beam is swept in the direction shown by arrow X, the optical disc as a medium is gradually raised in temperature, from the distal side relative to the scanning direction of the light beam spot SP, until finally the temperature becomes higher than the melting point MP of the layer 104. In this stage, the layer 104 is in the melted state, from its initial crystal state, and is lowered in e.g. reflectance, as a result of transition to the melted state. The reflectance of a hatched region $P_X$ within the beam spot SP is lowered. That is, the region $P_X$ in which the phase pit 101 can hardly be read and a region $P_Z$ remaining in the crystallized state exist within the beam spot SP. That is, even when two phase pits 101, for example, exist in one and the same spot SP as shown, it is only the phase pit 101 present in the high reflectance region $P_Z$ that can be read, whereas the other phase pit 101 is present in the region $P_X$ with extremely low reflectance and hence cannot be read. In this manner, only the single phase pit 101 can be read even although plural phase pits 101 exist in the same spot SP.

Therefore, if the wavelength of the readout beam is $\lambda$ and the numerical aperture of the objective lens is NA, readout can evidently be made satisfactorily even with the minimum phase pit interval of the recording signals along the scanning direction of the readout beam of not more than $\lambda/2NA$, so that signals can be read with ultra-high resolution to increase the recording density, above all, the line density, and hence the recording capacity of the recording medium.

In the above embodiment, operating conditions, such as film thicknesses, are set so that the reflectance is low or high when the layer of the phase change material 104 is in the melted state or in the crystallized state, respectively. However, the thickness or the constitution of each layer or the phase change material may be so set that the reflectance becomes high or low in the melted state or in the crystallized state, respectively, in which case a phase pit 101 may be present in the high temperature region $P_X$ in the laser beam spot SP shown in FIG. 18A so that only this phase pit in the high temperature region $P_X$ is read. In the case of an irreversible phase change in which a region is rased in temperature by laser light irradiation to reach the melted and crystallized region $R_3$ such that it cannot be reset to the initialized state or crystallized state even if cooled to ambient temperature, it is only necessary to perform some initializing operation within the scope of the present invention. For example, by radiating an elliptical spot after the reproducing laser spot for heating the layer 104 to the melted and crystallized region $R_2$, or by heating to a temperature lower than the melting point MP and not lower than the crystallization temperature, the layer 104 may be initialized by being reset from the amorphous state to the crystallized state.

Although the reflectance is changed in the above embodiment by phase changes of the recording medium, the reflectance may be changed by taking advantage of any other phenomenon. Thus, for example, the reflectance may be changed by temperature by taking advantage of changes in spectral characteristics caused by moisture adsorption by an interference filter according to a modified embodiment shown in FIG. 19.

Figure 19:
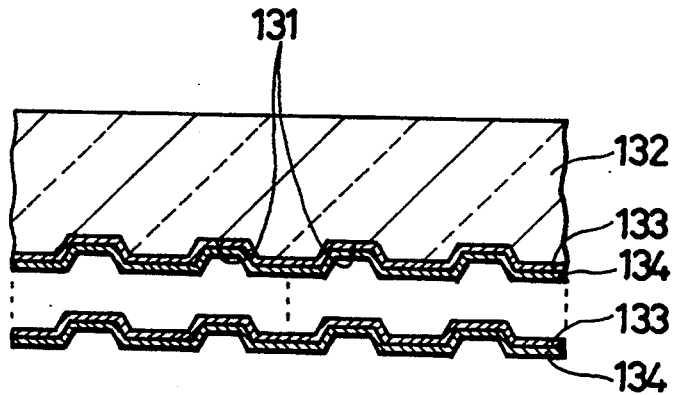
FIG. 19 is a schematic cross-sectional view showing essential parts of another example of the variable reflectance optical disc employed in the embodiment shown in FIG. 9.

In the embodiment shown in FIG. 19, materials with markedly different refractive indices are repeatedly deposited on a transparent substrate 132, on which phase pits 131 are previously formed, to thicknesses equal to one fourths of the wavelength $\lambda$ of the reproducing beam, for forming an interference filter. In the present embodiment, an MgF layer 133 (with a refractive index of 1.38) and an ZnS layer 134 (with a refractive index of 2.35) are used as the materials with markedly different refractive indices. However, any other combinations of the materials having larger differences in refractive indices may be employed. For example, SiO having a lower refractive index of 1.6 may be used as a low refractive index material, and $TiO_2$ with a refractive index of 2.73 or $CeO_2$ with refractive index of 2.35 may be used as a high refractive index material.

Figure 20:
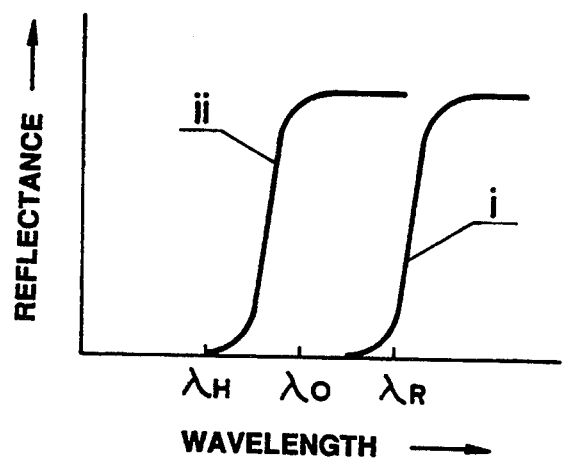
FIG. 20 is a graph showing the state of change in reflectance spectral characteristics with changes in temperature in an interference filter.

The above-mentioned MgF layer 133 or the ZnS layer 134 are deposited by evaporation. If the reached vacuum is set to a value of e.g. $10^{-4}$ Torr which is lower than a usual value, the film structure becomes porous to permit the moisture to be captured. With the interference filter formed by a film which thus has captured the moisture, the reflectance and spectral characteristics are changed markedly between the state in which the filter is at room temperature and the state in which the filter is heated to close to the boiling point of water, as shown in FIG. 20. That is, an acute wavelength shift is observed, in which the spectral characteristics at room temperature are as shown by a curve i having a point of inflection at a wavelength $\lambda_R$ while the characteristics at approximately the boiling point are as shown by a curve ii having a point of inflection at wavelength $\lambda_H$ and returned to the characteristics shown by curve i on lowering the temperature. This phenomenon may be probably caused by acute changes in refractive index due to vaporization of the moisture resulting in changes in spectral characteristics.

Therefore, if the wavelength of the light source of the reproducing beam is selected to a wavelength $\lambda_0$ intermediate between these points of inflection $\lambda_R$ and $\lambda_H$, the reflectance is dynamically changed between the state of room temperature and the heated state.

In the present embodiment, high density reproduction is performed by taking advantage of these changes in reflectance. The mechanism of high density reproduction is described in connection with FIG. 18. In this case, the region in which the moisture is vaporized to produce wavelength shift corresponds to the high reflectance region, while the portion of the medium in which the temperature is not raised is the mask region. In the present embodiment, the reflectance characteristics are reverted to the original state when the temperature is lowered, so that no particular erasure operation is required.

By using the reflectance change type optical disc as the optical disc 100 shown in FIG. 12, the size of the effective reproducing region (the higher reflectance region of the regions $P_X$ and $P_Z$ in FIG. 18) may be rendered constant despite temperature changes of the optical disc 100, so that reproduction may be performed stably to assure high quality reproduction signals.

It is to be noted that the present invention is not limited to the above-described embodiments, but may be applied to, for example, a card- or sheet-shaped optical recording medium besides the disc-shaped recording medium.

We claim:

1. A method for reproducing information on an optical recording medium comprising a recording layer and a reproducing layer, said recording and reproducing layers being magnetically coupled to each other in steady state, said method comprising:
   extinguishing magnetic coupling between the recording layer and the reproducing layer in a region the temperature of which is raised to a temperature higher than a predetermined temperature by irradiation of a readout laser beam during reproduction,
   reading the recording information held by said recording layer in an area of an irradiated region other than the magnetic coupling extinguished region,
   detecting a reproducing position on said optical recording medium when rotating said optical recording medium at a constant rotational velocity for reproducing said recording medium, and
   controlling the size of the magnetic coupling extinguished region in accordance with changes in the linear velocity at said reproducing position.

2. The method for reproducing information on an optical recording medium comprising a recording layer and a reproducing layer, said recording and reproducing layers being magnetically coupled to each other in steady state, said method comprising:
   extinguishing magnetic coupling between the recording layer and the reproducing layer in a region the temperature of which is raised to a temperature higher than a predetermined temperature by irradiation of a readout laser beam during reproduction,
   reading the recording information held by said recording layer in an area of an irradiated region other than the magnetic coupling extinguished region,
   detecting a reproducing position on said optical recording medium when rotating said optical recording medium at a constant rotational velocity for reproducing said recording medium,
   controlling the size of the magnetic coupling extinguished region in accordance with the linear velocity at said reproducing position, and
   controlling an output of a laser light source radiating the readout beam to said optical recording medium based on an output detecting the reproducing position of said optical recording medium.

3. The method as defined in claim 2, further comprising:
   controlling the output of the laser light source based on a comparison output between the output detecting the reproducing position of said optical recording medium and an output reference value of the laser light source associated with the linear velocity of the optical recording medium.

4. The method as defined in claim 2, further comprising:
   controlling the size of a second region based on the level of the output reproducing said optical recording medium.

5. A method for reproducing information on an optical recording medium having a recording layer and a reproducing layer, said method comprising:
   aligning domains of the reproducing layer,
   transcribing the recording information to said reproducing layer and relieving the transcribed information, said recording information being held before transcription by a region on said recording layer the temperature of which is increased by irradiation with a readout beam during reproduction,
   reading said recording information from a relived region of said reproducing layer,
   detecting a reproducing position on said optical recording medium when rotating said optical recording medium at a constant rotational velocity for reproduction, and
   controlling the size of said relieved region in accordance with changes in the linear velocity at said reproducing position.

6. The method as defined in claim 5, further comprising:
   irradiating said readout beam of a laser light source based on an output detecting the reproducing position on said optical recording medium.

7. The method as defined in claim 6, further comprising:
   controlling an output of said laser light source based on a comparison output between the output detecting the reproducing position on said optical recording medium and an output reference value of said laser light source associated with the linear velocity of said recording medium stored in storage means.

8. The method as defined in claim 5, further comprising:
   controlling the strength of an external magnetic field impressed on said optical recording medium by external magnetic field generating means from the opposite side of said optical recording medium relative to said readout beam.

9. The method as defined in claim 5, further comprising:
   controlling the strength of an external magnetic field from an external magnetic field generating means by adding the output detecting the reproducing position of said optical recording medium and a correcting value associated with the linear velocity of the optical recording medium stored in storage means to an input signal of said external magnetic field generating means positioned to impress the external magnetic field on said optical recording medium from the opposite side of said readout beam with respect to said optical recording medium.

10. The method as defined in claim 5, further comprising:
    controlling the size of a magnetic coupling extinguished region based on the level of the output reproducing said optical recording medium.

11. A method for reproducing information on an optical recording medium, comprising:
    radiating a readout beam to an optical disc on which phase pits are formed in accordance with signals, the phase pits being changed in reflectance with temperatures,
    reading said phase pits with said readout beam and partially changing the reflectance of said phase pits within a scanning spot of said readout beam as a result of being impinged by said readout beam, detecting a reproducing position on said optical recording medium when rotating said optical recording medium at a constant rotational velocity for reproduction, and controlling the size of a portion within the scanning spot of the readout beam in which the reflectance is changed as the result of being impinged by said readout beam.

12. The method as defined in claim 11, further comprising:

controlling an output of a laser light source radiating said readout beam to said optical recording medium on the basis of an output detecting the reproducing position of said optical recording medium.

13. The method as defined in claim 12, further comprising:

controlling the output of said laser light source on the basis of a comparison output between the output detecting the reproducing position of said optical recording medium and an output reference value of said laser light source which is stored in storage means and which is associated with the linear velocity of said optical recording medium.

14. The method as defined in claim 11, further comprising:

controlling the size of a portion of the scanning spot of said readout beam which is changed in reflectance on the basis of the level of an output reproducing said optical recording medium.

* * * * *